(12) United States Patent
Hara et al.

(10) Patent No.: US 12,523,534 B2
(45) Date of Patent: Jan. 13, 2026

(54) ELECTROMAGNETIC WAVE SENSOR

(71) Applicant: TDK CORPORATION, Tokyo (JP)

(72) Inventors: Shinji Hara, Tokyo (JP); Naoki Ohta, Tokyo (JP); Tadao Senriuchi, Tokyo (JP); Susumu Aoki, Tokyo (JP); Kazuya Maekawa, Tokyo (JP); Maiko Kokubo, Tokyo (JP); Yusuke Kimoto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 168 days.

(21) Appl. No.: 18/387,883

(22) Filed: Nov. 8, 2023

(65) Prior Publication Data

US 2024/0210249 A1 Jun. 27, 2024

(30) Foreign Application Priority Data

Nov. 18, 2022 (JP) .................. 2022-184740

(51) Int. Cl.
*G01J 5/22* (2006.01)
*G01J 5/08* (2022.01)
(52) U.S. Cl.
CPC .............. *G01J 5/22* (2013.01); *G01J 5/0853* (2013.01)
(58) Field of Classification Search
CPC ...... G01J 5/22; G01J 5/0853; G01J 2005/202; G01J 5/024; G01J 5/20; G01J 5/023
See application file for complete search history.

(56) References Cited

U.S. PATENT DOCUMENTS

| | | | |
|---|---|---|---|
| 5,743,006 A | 4/1998 | Beratan | |
| 10,937,914 B1* | 3/2021 | Egerton | ................. H10F 77/122 |
| 2011/0267473 A1* | 11/2011 | Kabasawa | .............. H10N 15/15 |
| | | | 257/467 |
| 2020/0408604 A1* | 12/2020 | Ohta | ......................... G01J 5/22 |
| 2022/0178759 A1 | 6/2022 | Shirokawa et al. | |
| 2022/0262548 A1 | 8/2022 | Aoki et al. | |

FOREIGN PATENT DOCUMENTS

| | | |
|---|---|---|
| GB | 2 206 997 A | 1/1989 |
| JP | S63-27722 A | 2/1988 |
| JP | 2022-89433 A | 6/2022 |
| JP | 2022-126582 A | 8/2022 |
| WO | 2019/171488 A1 | 9/2019 |

OTHER PUBLICATIONS

Mar. 13, 2024 Extended European Search Report issued in European Patent Application No. 23209715.4.

* cited by examiner

*Primary Examiner* — Kiho Kim
(74) *Attorney, Agent, or Firm* — Oliff PLC

(57) ABSTRACT

The electromagnetic wave sensor includes: a first substrate; a first wire which extends in a first direction parallel to a substrate surface of the first substrate in a plan view from a direction perpendicular to the substrate surface; a second wire which extends in a direction parallel to the substrate surface and different from the first direction in the plan view; and an electromagnetic wave detector which is electrically connected to the first wire and is electrically connected to the second wire, wherein the first wire is located on the first substrate side in relation to the electromagnetic wave detector in a third direction orthogonal to the first direction and the second direction and the second wire is located on a side opposite to the first substrate in relation to the electromagnetic wave detector in the third direction.

22 Claims, 15 Drawing Sheets

FIG. 9
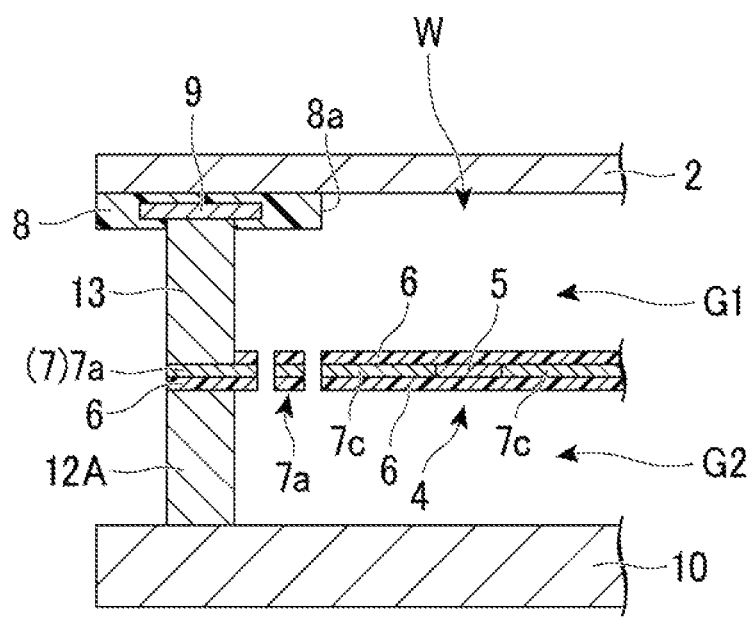
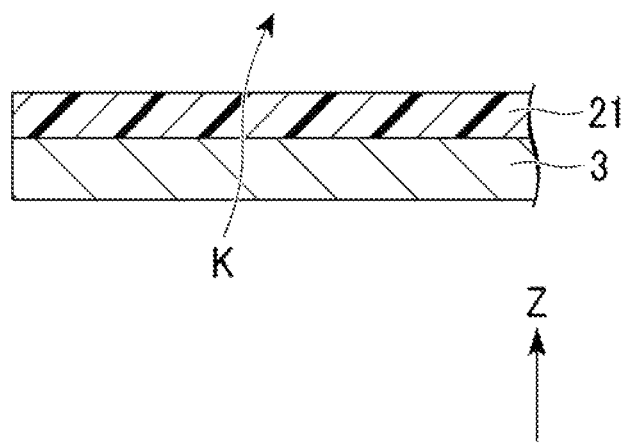

FIG. 10
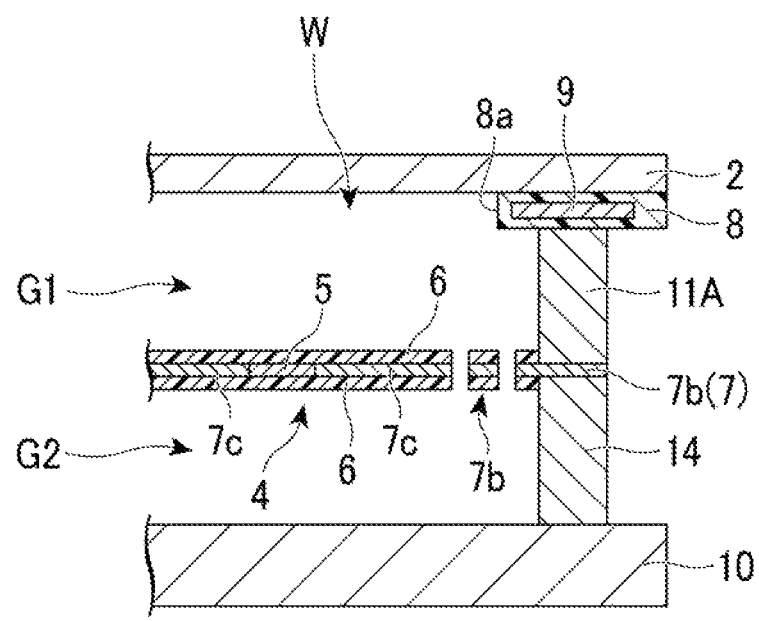
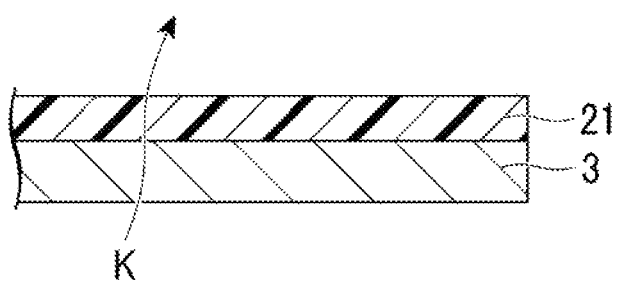

FIG. 11
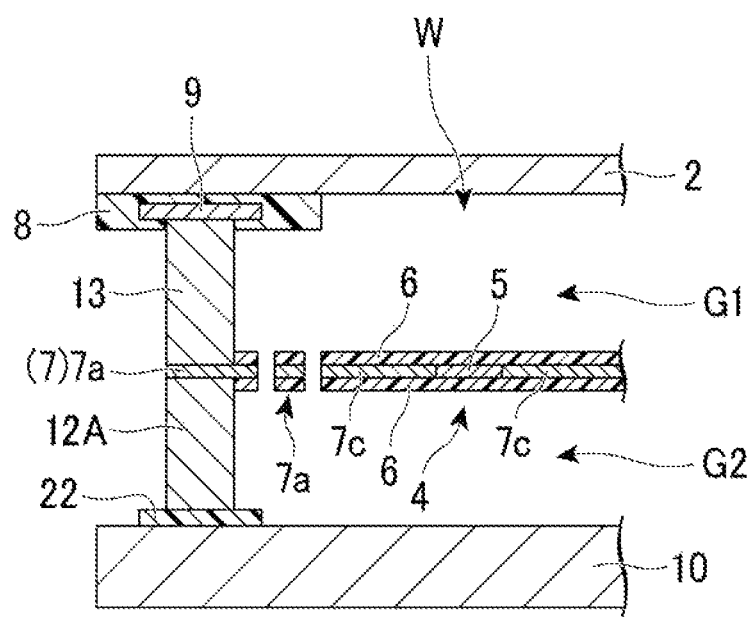
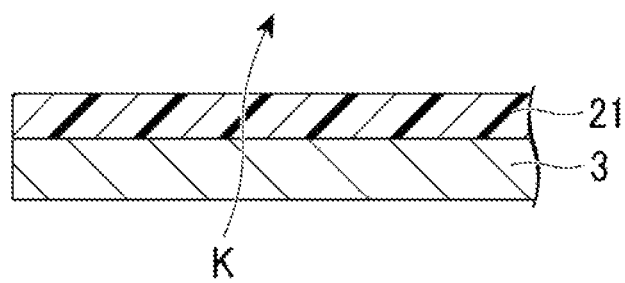

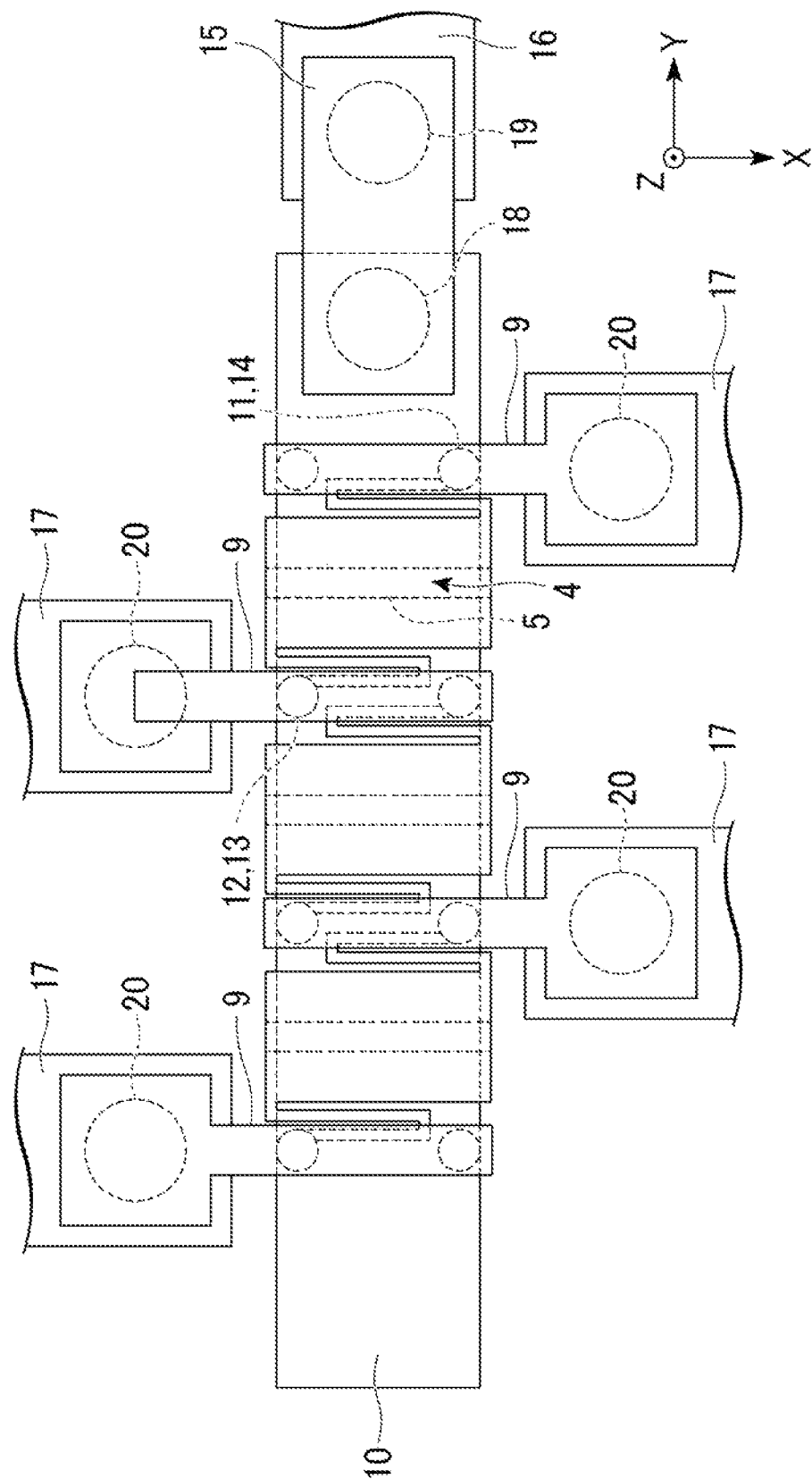

ELECTROMAGNETIC WAVE SENSOR

CROSS-REFERENCES TO RELATED APPLICATIONS

This application relies for priority upon Japanese Patent Application No. 2022-184740 filed on Nov. 18, 2022, the entire content of which is hereby incorporated herein by reference for all purposes as if fully set forth herein.

BACKGROUND

The present disclosure relates to an electromagnetic wave sensor.

For example, an electromagnetic wave sensor using an electromagnetic wave detector such as a thermistor element is known. The electrical resistance of a thermistor film of the thermistor element changes according to the temperature change of the thermistor film. In the electromagnetic wave sensor, infrared rays (electromagnetic waves) incident on the thermistor film are absorbed by the thermistor film or materials around the thermistor film, so that the temperature of the thermistor film changes. Accordingly, the thermistor element detects infrared rays.

Here, according to the Stefan-Boltzmann law, there is a correlation between the temperature of a measurement target and infrared rays (radiant heat) emitted from the measurement target by heat radiation. Thus, the temperature of the measurement target can be measured in a non-contact manner by detecting infrared rays emitted from the measurement target using the thermistor element.

Further, such thermistor elements are arranged in a two-dimensional array in a row direction and a column direction and are applied to electromagnetic wave sensors such as infrared imaging devices (infrared image sensors) that two-dimensionally detect (image) the temperature distribution of the measurement target (for example, see PCT International Publication No. WO 2019/171488).

SUMMARY

Incidentally, the thermistor element in the above-described electromagnetic wave sensor is provided for each region partitioned by a plurality of first wires extending in a row direction and a plurality of second wires extending in a column direction. Further, the first wire and the second wire electrically connected to the thermistor element are arranged at different positions in a thickness direction within an insulator layer and are arranged to three-dimensionally intersect each other.

Therefore, in the conventional electromagnetic wave sensor, the parasitic capacitance generated in the portion where the first wire and the second wire are close to each other sometimes lowers the operating speed and detection accuracy.

It is desirable to provide an electromagnetic wave sensor with high operating speed and high detection accuracy.

Following means are provided.

An electromagnetic wave sensor including:
a first substrate;
a first wire which extends in a first direction parallel to a substrate surface of the first substrate in a plan view from a direction perpendicular to the substrate surface;
a second wire which extends in a second direction parallel to the substrate surface and different from the first direction in the plan view; and
an electromagnetic wave detector which is electrically connected to the first wire and is electrically connected to the second wire,
wherein the first wire is located on a first substrate side in relation to the electromagnetic wave detector in a third direction orthogonal to the first direction and the second direction, and
wherein the second wire is located on the side opposite to the first substrate in relation to the electromagnetic wave detector in the third direction.

BRIEF DESCRIPTION OF THE DRAWINGS

FIG. 9 is a cross-sectional view showing the configuration of an electromagnetic wave sensor according to a third embodiment of the present disclosure.

FIG. 10 is a cross-sectional view showing the configuration of an electromagnetic wave sensor according to a fourth embodiment of the present disclosure.

FIG. 11 is a cross-sectional view showing the configuration of an electromagnetic wave sensor according to a fifth embodiment of the present disclosure.

FIG. 15 is a plan view schematically showing the configuration of an electromagnetic wave sensor according to a ninth embodiment of the present disclosure.

DETAILED DESCRIPTION

Figure 1:
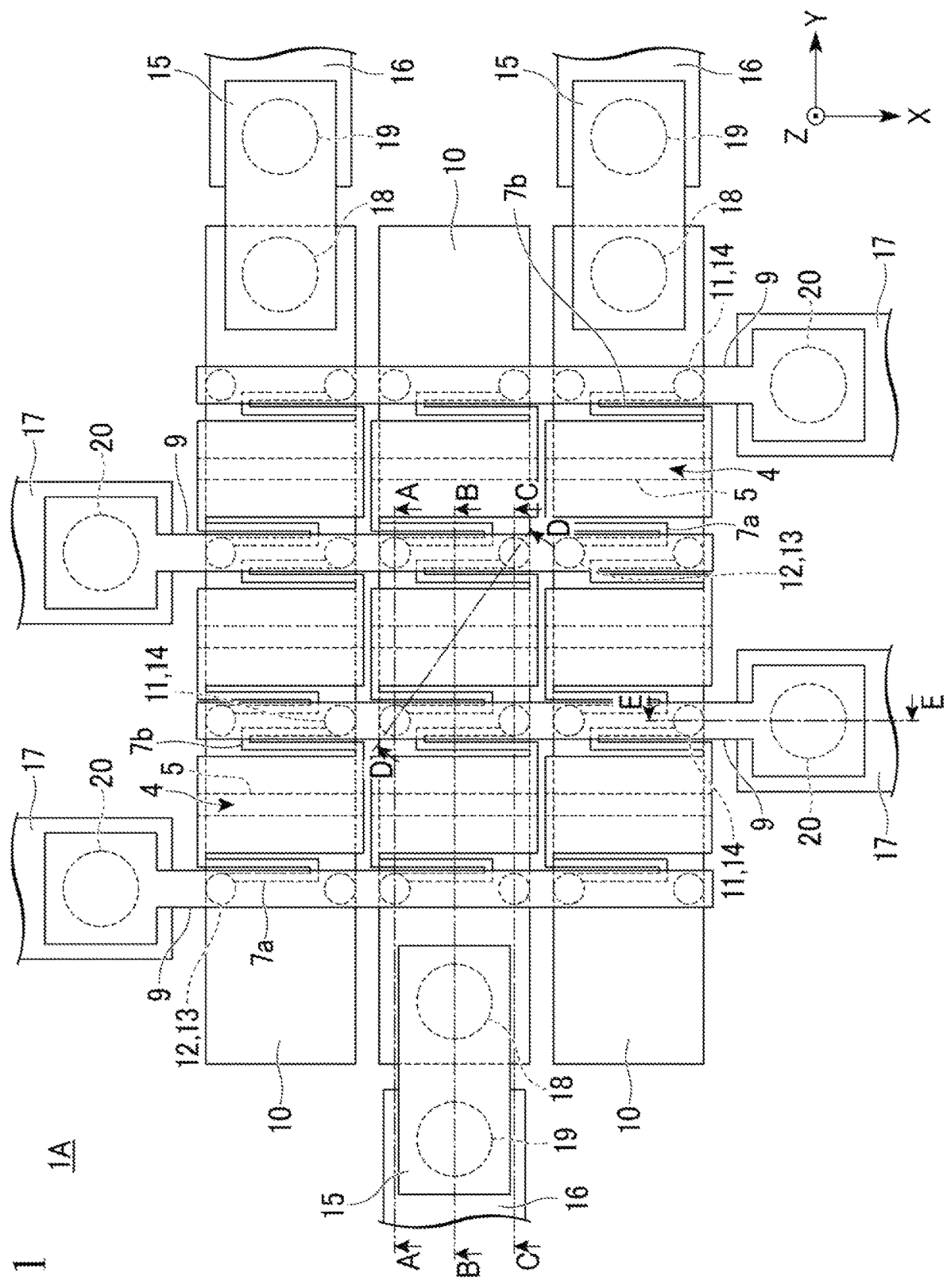
FIG. 1 is a plan view showing the configuration of an electromagnetic wave sensor according to a first embodiment of the present disclosure.

Hereinafter, embodiments of the present disclosure will be described in detail with reference to the drawings.

In addition, in the drawings used in the following description, in order to make each component easier to see, the scale of the dimensions may be changed depending on the component, and the dimensional ratio of each component may not necessarily be the same as the actual one. Further, the materials and the like exemplified in the following description are only examples, and the present disclosure is not necessarily limited to them and can be implemented with appropriate modifications without changing the gist of the invention.

Further, in the drawings illustrated below, an XYZ orthogonal coordinate system is set, the X-axis direction is set as the first direction X within a specific plane of the electromagnetic wave sensor, the Y-axis direction is set as the second direction orthogonal to the first direction X within a specific plane of the electromagnetic wave sensor, and the Z-axis direction is set as the third direction Z orthogonal to a specific plane of the electromagnetic wave sensor. The third direction Z is a direction orthogonal to the first direction X and the second direction Y. Further, in the following description, the +Z-axis direction in the drawings is the upward direction and the −Z-axis direction is the downward direction.

According to the present disclosure, it is possible to provide the electromagnetic wave sensor with high operating speed and high detection accuracy.

First Embodiment

First, an electromagnetic wave sensor 1A, for example, illustrated in FIGS. 1 to 7 will be described as a first embodiment of the present disclosure.

Figure 2:
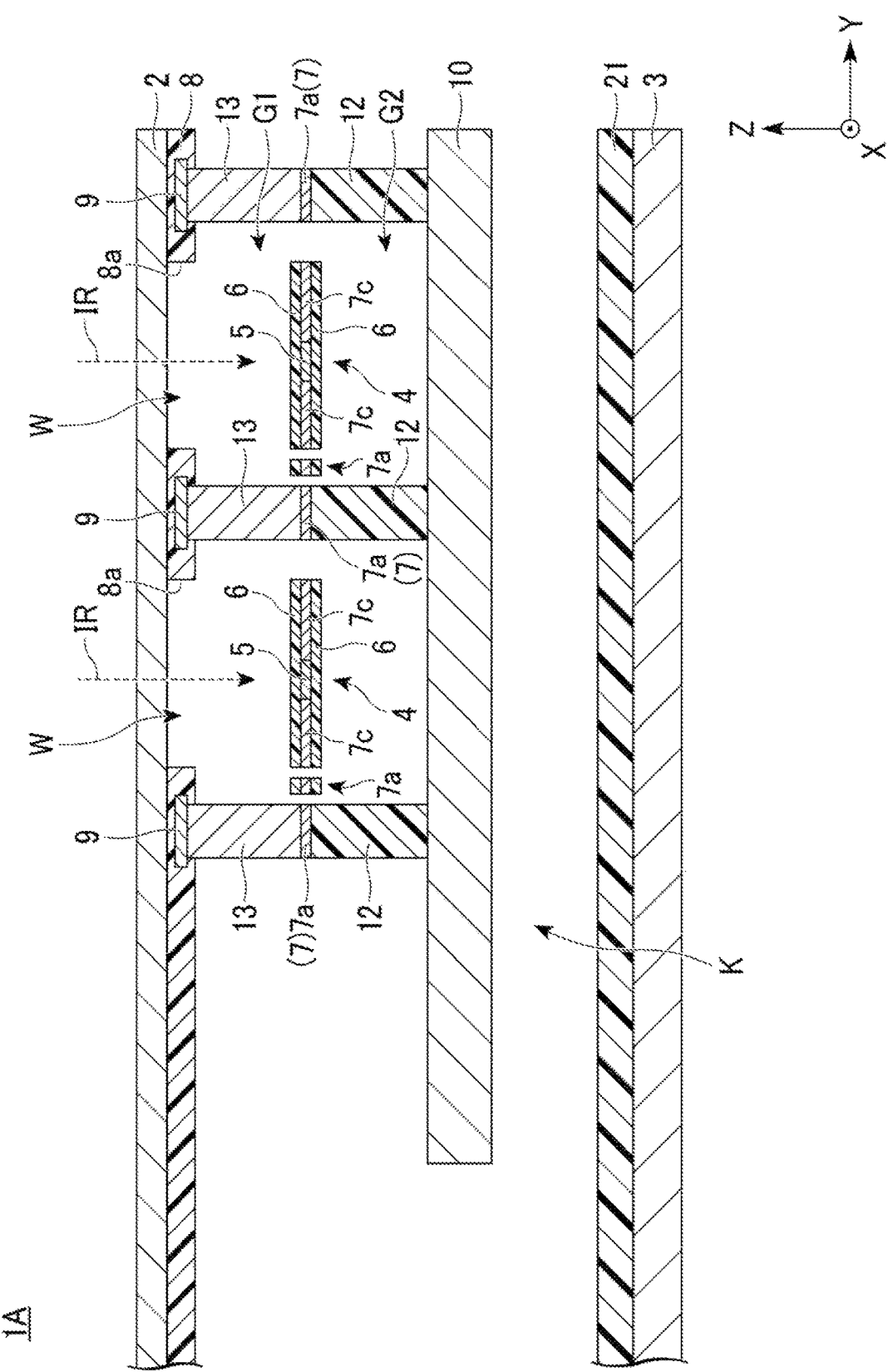
FIG. 2 is a cross-sectional view of the electromagnetic wave sensor taken along line segment A-A shown in FIG. 1.
Figure 3:
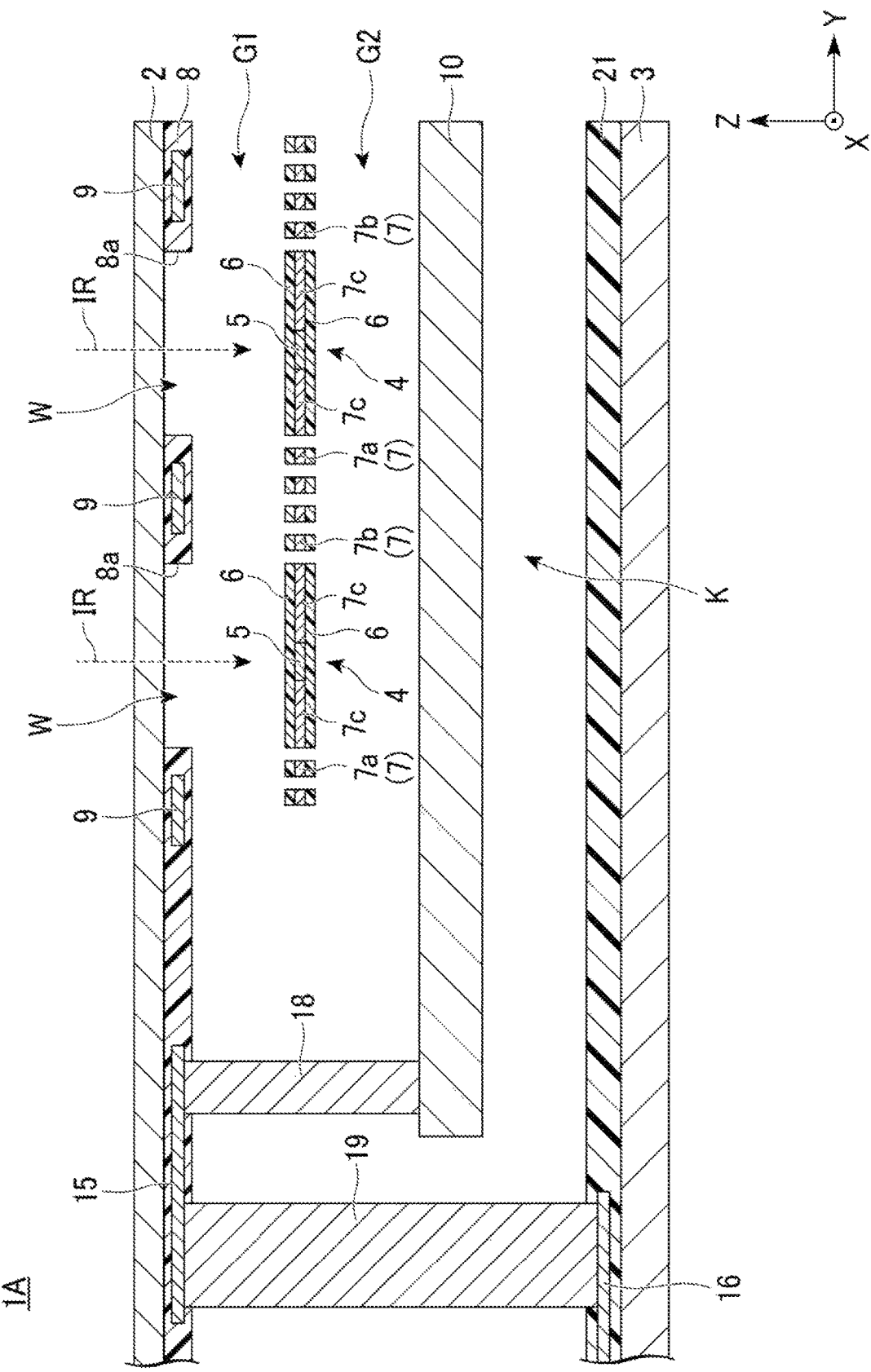
FIG. 3 is a cross-sectional view of the electromagnetic wave sensor taken along line segment B-B shown in FIG. 1.
Figure 4:
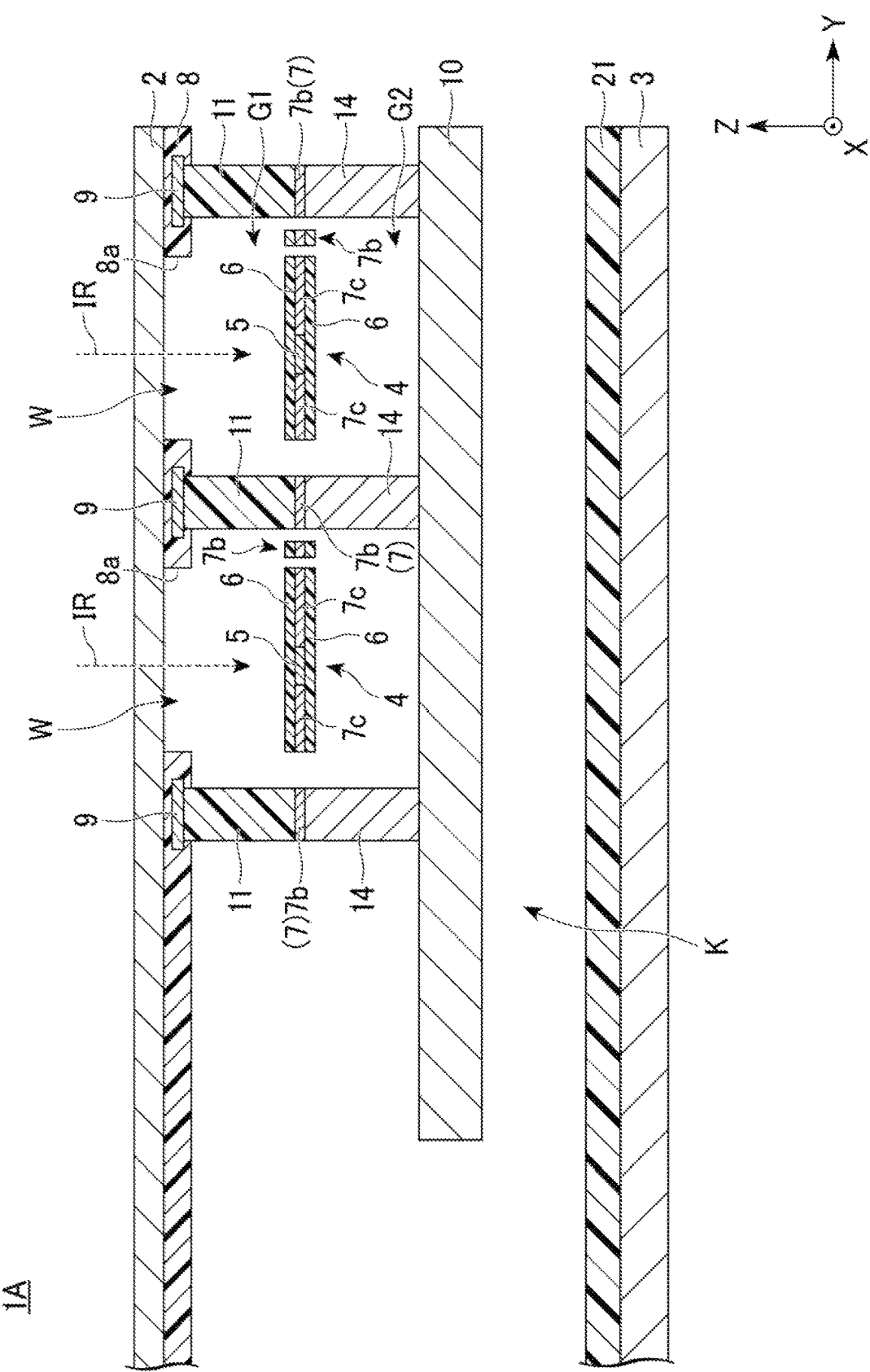
FIG. 4 is a cross-sectional view of the electromagnetic wave sensor taken along line segment C-C shown in FIG. 1.
Figure 5:
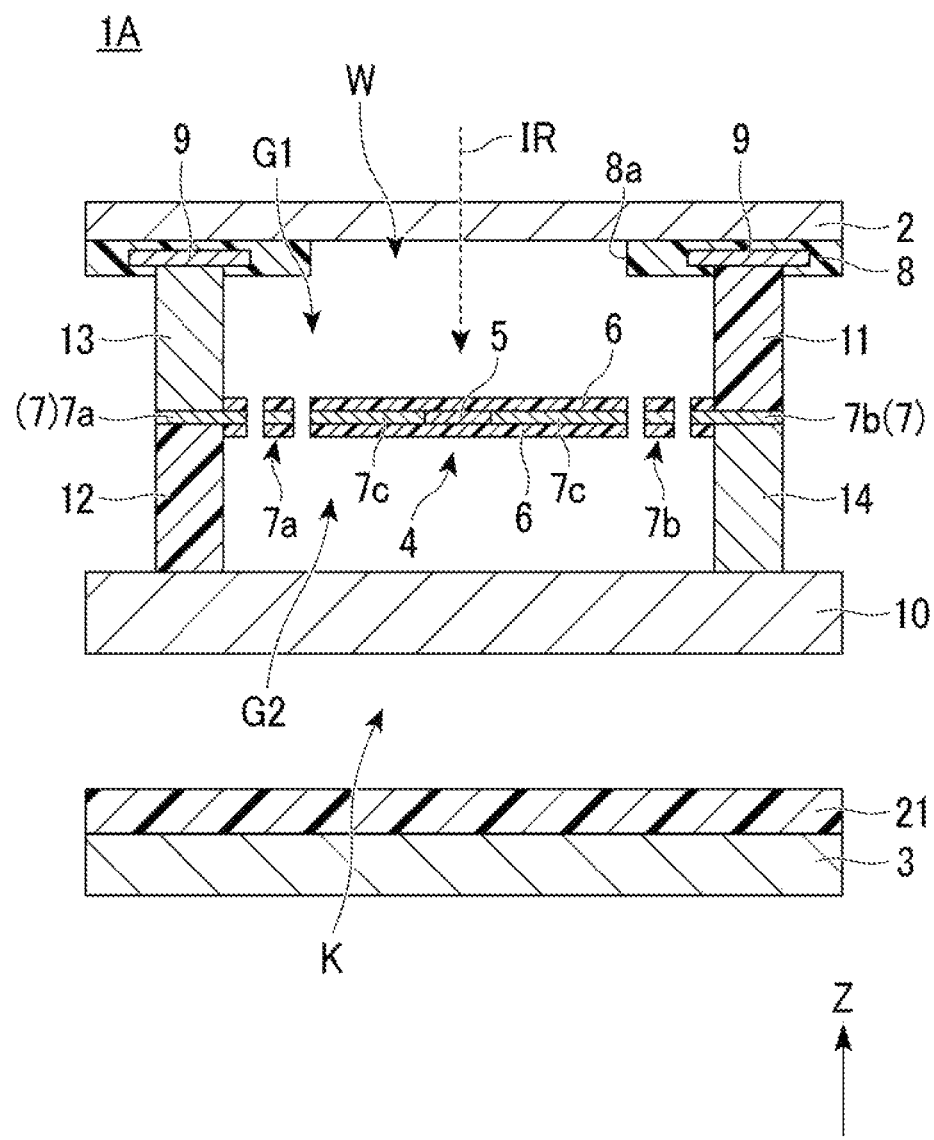
FIG. 5 is a cross-sectional view of the electromagnetic wave sensor taken along line segment D-D shown in FIG. 1.
Figure 6:
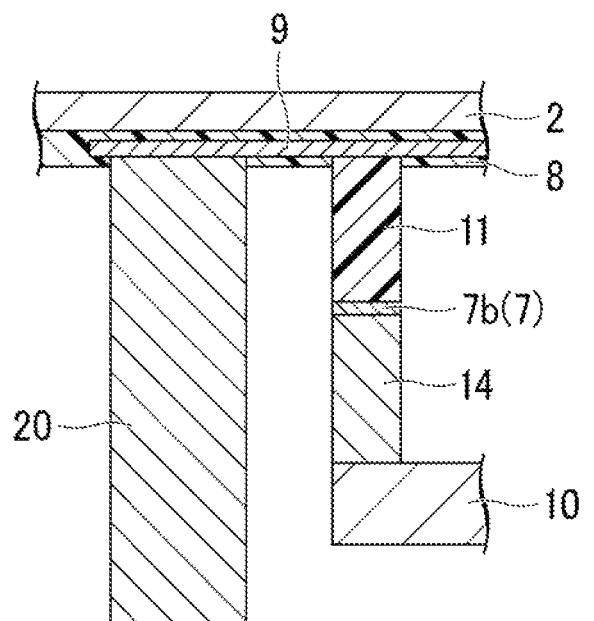
FIG. 6 is a cross-sectional view of the electromagnetic wave sensor taken along line segment E-E shown in FIG. 1.
Figure 7:
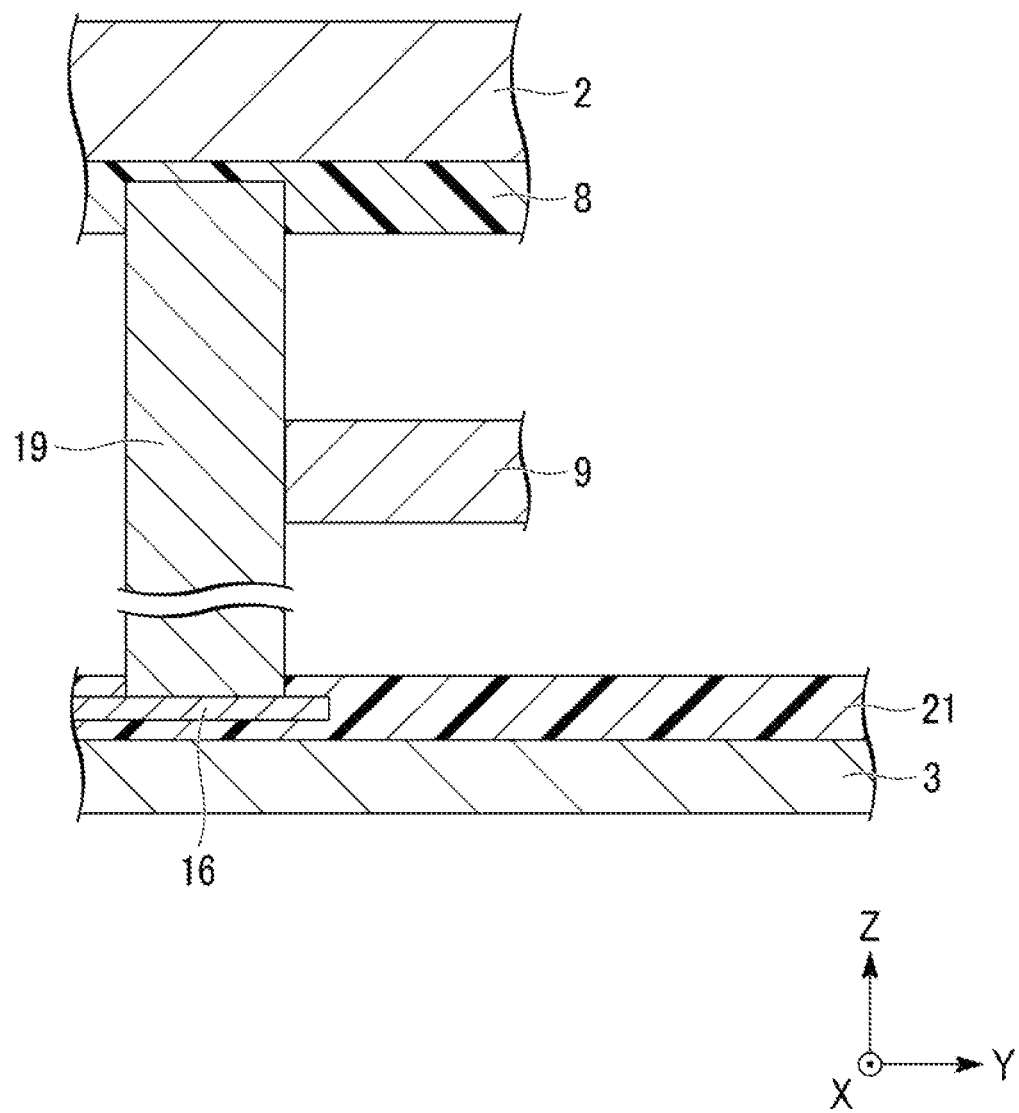
FIG. 7 is a cross-sectional view showing another configuration example of the electromagnetic wave sensor shown in FIG. 1.

Additionally, FIG. 1 is a plan view illustrating the configuration of an electromagnetic wave sensor 1A. FIG. 2 is a cross-sectional view of the electromagnetic wave sensor 1A taken along line segment A-A shown in FIG. 1. FIG. 3 is a cross-sectional view of the electromagnetic wave sensor 1A taken along line segment B-B shown in FIG. 1. FIG. 4 is a cross-sectional view of the electromagnetic wave sensor 1A taken along line segment C-C shown in FIG. 1. FIG. 5 is a cross-sectional view of the electromagnetic wave sensor 1A taken along line segment D-D shown in FIG. 1. FIG. 6 is a cross-sectional view of the electromagnetic wave sensor 1A taken along line segment E-E shown in FIG. 1. FIG. 7 is a cross-sectional view showing another configuration example of the electromagnetic wave sensor 1A.

The electromagnetic wave sensor 1A of this embodiment is obtained by applying the present disclosure to an infrared imaging element (infrared image sensor) that two-dimensionally detects (images) the temperature distribution of the measurement target by detecting infrared rays emitted from the measurement target.

Infrared rays are electromagnetic waves with a wavelength of 0.75 μm or more and 1000 μm or less. Infrared image sensors are used as infrared cameras for indoor and outdoor night vision, and are also used as non-contact temperature sensors for measuring the temperature of people and objects.

Specifically, the electromagnetic wave sensor 1A includes, as illustrated in FIGS. 1 to 6, first and second substrates 2 and 3 which are arranged to face each other and thermistor elements 4 which are arranged between the first substrate 2 and the second substrate 3.

The first substrate 2 and the second substrate 3 are silicon substrates having transparency with respect to electromagnetic waves of a certain wavelength, specifically, infrared rays IR having a wavelength band including a wavelength of 10 μm (in this embodiment, long wavelength infrared rays with wavelengths of 8 to 14 μm). Further, a germanium substrate or the like can be used as the substrate having transparency to infrared rays IR.

The electromagnetic wave sensor 1A of this embodiment is configured such that electromagnetic waves which are emitted from the measurement target and will be detected (infrared rays IR emitted from the measurement target) are incident from the first substrate side. That is, the first substrate 2 is a substrate through which electromagnetic waves to be detected are transmitted.

The first substrate 2 and the second substrate 3 form an internal space K therebetween by sealing the periphery of the surfaces facing each other using a scaling material (not illustrated). Further, the internal space K is depressurized to a high vacuum.

Accordingly, in the electromagnetic wave sensor 1A of this embodiment, the influence of heat due to convection in the internal space K is suppressed and the influence of heat other than infrared rays IR emitted from the measurement target with respect to a thermistor element 4 is eliminated.

Additionally, the electromagnetic wave sensor 1A of this embodiment is not necessarily limited to a configuration in which the sealed internal space K is depressurized and may be configured to have the internal space K sealed or open under atmospheric pressure.

The substrate surface of the first substrate 2 is parallel to the XY plane including the first direction X and the second direction Y. That is, the first direction X is a direction parallel to the substrate surface of the first substrate 2 and the second direction Y is a direction parallel to the substrate surface of the first substrate 2.

The thermistor element 4 is an electromagnetic wave detector which detects infrared rays IR and includes a thermistor film 5 which is a temperature sensing element and an insulating film 6 which is an electromagnetic wave absorber covering at least a part (the entire portion in this embodiment) of the thermistor film 5.

As the thermistor film 5, for example, vanadium oxide, amorphous silicon, polycrystalline silicon, spinel crystal structure oxide containing manganese, titanium oxide, yttrium-barium-copper oxide, or the like can be used.

As the insulating film 6, for example, aluminum nitride, silicon nitride, aluminum oxide, silicon oxide, magnesium oxide, tantalum oxide, niobium oxide, hafnium oxide, zirconium oxide, germanium oxide, yttrium oxide, tungsten oxide, bismuth oxide, calcium oxide, aluminum oxynitride, silicon oxynitride, magnesium aluminum oxide, silicon boride, boron nitride, sialon (oxynitride of silicon and aluminum), or the like can be used.

The thermistor element 4 has a CPP (Current-Perpendicular-to-Plane) structure in which a current flows in a direction orthogonal to the surface of the thermistor film 5. That is, although not shown in the drawings, the thermistor element 4 includes a pair of first electrodes provided to contact, one surface of the thermistor film 5 and a second electrode provided to contact the other surface of the thermistor film 5. Accordingly, a current can flow from one first electrode toward the second electrode in a direction orthogonal to the surface of the thermistor film 5 and a current can flow from the second electrode toward the other first electrode in a direction orthogonal to the surface of the thermistor film 5.

On the other hand the thermistor element 4 is not limited to such a CPP structure and may have a CIP (Current-In-Plane) structure in which a current flows between the pair of first electrodes in the in-plane direction of the thermistor film 5 by omitting the second electrode.

The insulating film 6 may be provided to cover at least a part of at least the thermistor film 5. In this embodiment, the insulating film 6 is provided to cover both surfaces of the thermistor film 5.

The thermistor elements 4 are formed with the same size as each other. Further, the thermistor elements 4 are arranged in a two-dimensional array within a plane parallel to the substrate surface of the first substrate 2 (hereinafter, referred to as "specific plane"). That is, the thermistor elements 4 are arranged in a matrix in the first direction X and the second direction Y that intersect each other (orthogonally in this embodiment) within a specific plane in a plan view from the direction (the third direction Z) perpendicular to the substrate surface of the first substrate 2. Additionally, the first direction X and the second direction Y do not necessarily have to be orthogonal within a specific plane.

Further, the thermistor elements 4 are arranged side by side at regular intervals in the first direction X and the second direction Y on the assumption that the first direction X is the row direction and the second direction Y is the column direction.

Additionally, the number of matrices of the thermistor elements 4 is, for example, 640 rows×480 columns, 1024 rows×768 columns, or the like, but the present disclosure is not limited to the number of matrices. That is, the number of matrices can be changed as appropriate.

A window portion W for transmitting infrared rays IR between the first substrate 2 and the thermistor film 5 exists in an area facing each thermistor film 5 and the first substrate 2 in the thickness direction (an overlapping area in the plan view). Additionally, in the window portion W, a part of a first insulator layer 8 provided on the substrate surface of the first substrate 2 to be described later is removed. That is, a hole portion 8a penetrating the first insulator layer 8 is provided in an area in which the window portion W overlaps each thermistor element 4 in the plan view.

A pair of arm portions 7a and 7b electrically connected to the thermistor film 5 is connected to each thermistor element 4. The pair of arm portions 7a and 7b include a linear wiring layer 7 electrically connected to the pair of first electrodes and the insulating film 6 provided to cover both surfaces of the wiring layer 7.

The wiring layer 7 is made of, for example, a conductive film made of at least one selected from aluminum, gold, silver, copper, tungsten, titanium, tantalum, chromium, silicon, titanium nitride, tantalum nitride, chromium nitride, tungsten nitride, and zirconium nitride, if sufficient mechanical strength of each of the arm portions 7a and 7b can be obtained only by the wiring layer 7, the insulating films 6 provided on both surfaces of the wiring layer 7 can be omitted.

The pair of arm portions 7a and 7b are located on both sides of the thermistor element 4 in the plan view in the third direction Z. Further, each of the arm portions 7a and 7b includes at least a portion which extends along the periphery of the thermistor element 4 and a portion which is connected to the thermistor element 4.

Specifically, the arm portions 7a and 7b of this embodiment have a structure in which a plurality of (two in this embodiment) portions extending in the first direction X are arranged side by side in the second direction Y and a first end and a second end adjacent to each other are connected through a portion extending in the second direction Y. That is, the an portions 7a and 7b of this embodiment have a structure in which a plurality of portions extending in the first direction X are folded back at the portions extending in the second direction Y.

Further, the pair of arm portions 7a and 7b are connected to the thermistor element 4 at positions sandwiching the thermistor element 4 through a portion extending in the second direction Y. The wiring layer 7 is connected to conductive layers 7c which are located on both sides with the thermistor film 5 interposed therebetween. The same material as exemplified for the wiring layer 7 can be used as the conductive layer 7c. Although not shown in the drawings, the wiring layer 7 of the arm portion 7a is electrically connected to the thermistor film 5 via the conductive layer 7c and one first electrode of the pair of first electrodes and the wiring layer 7 of the arm portion 7b is electrically connected to the thermistor film 5 via the conductive layer 7c and the other first electrode of the pair of first electrodes. In this embodiment, the conductive layer 7c constitutes a part of the thermistor element 4.

A surface facing the second substrate 3 in the first substrate 2 is provided with the first insulator layer 8 and a plurality of first wires 9.

The first insulator layer 8 is an insulating film formed on one surface of the first substrate 2 (the surface facing the second substrate 3). As the insulating film, for example, aluminum nitride, silicon nitride, aluminum oxide, silicon oxide, magnesium oxide, tantalum oxide, niobium oxide, hafnium oxide, zirconium oxide, germanium oxide, yttrium oxide, tungsten oxide, bismuth oxide, calcium oxide, aluminum oxynitride, silicon oxynitride, magnesium aluminum oxide, silicon boride, boron nitride, sialon (oxynitride of silicon and aluminum), and the like can be used.

The first wires 9 are made of, for example, a conductive film such as copper or gold and are provided to extend in the first direction X parallel to the substrate surface and to be arranged side by side at equal intervals in the second direction Y in the plan view from the direction (the third direction Z) perpendicular to the substrate surface of the first substrate 2.

In this embodiment, the first wire 9 is located within the layer of the first insulator layer 8. Additionally, at least the surface of the first wire 9 is exposed from the first insulator layer 8.

In the electromagnetic wave sensor 1A of this embodiment, the first wire 9 is located on the first substrate side in relation to the thermistor element 4 in the third direction Z. The positions of the first wires 9 in the third direction Z are located between the position of the thermistor element 4 in the third direction Z and the position of the first substrate 2 in the third direction Z.

On the other hand, a plurality of second wires 10 are provided on the side opposite to the first substrate 2 in relation to the thermistor element 4 in the third direction Z. The position of the thermistor element 4 in the third direction Z is between the positions of the second wires 10 in the third direction Z and the position of the first substrate 2 in the third direction Z. The second wires 10 are arranged between the first substrate 2 and the second substrate 3. That is, the second substrate 3 is located on the side opposite to the first substrate 2 in relation to the second wires 10 in the third direction Z.

The second wires 10 are made of, for example, a conductive film such as copper or gold and are provided to extend in the second direction Y parallel to the substrate surface of the first substrate 2 and to be arranged side by side at equal intervals in the first direction X in the plan view from the third direction Z.

Thus, the first wire 9 and the second wires 10 are arranged at different positions in the third direction Z to intersect three-dimensionally. That is, the first wires 9 are provided at intervals in the third direction Z and are arranged to three-dimensionally intersect the second wires 10. Further, the second wires 10 are provided at intervals in the third direction Z and are arranged to three-dimensionally intersect the first wires 9.

The second wire 10 includes a portion overlapping the thermistor element 4 in the plan view from the third direction Z. Accordingly, it is possible to improve the electromagnetic wave absorption efficiency since electromagnetic waves (infrared rays IR) of the measurement target transmitted through the thermistor element 4 are reflected by the second wire 10 and are incident to the thermistor element 4 again.

Further, the second wire 10 has a width larger than that of the first wire 9 in the plan view from the third direction Z. Accordingly, it is possible to increase the effect of improving the electromagnetic wave absorption efficiency and to decrease the electrical resistance value of the second wire 10. Further, the thickness of the second wire 10 in the third direction Z is larger than that of the first wire 9. Accordingly, it is possible to reduce the electrical resistance value of the second wire 10.

The electromagnetic wave sensor 1A of this embodiment includes a first pillar 11, a second pillar 12, a third pillar 13, and a fourth pillar 14 which extend in the direction including at least a component of the third direction Z (the third direction Z in this embodiment).

At least a part of the first pillar 11 is made of an insulator and is located between the first substrate 2 and the thermistor element 4 in the third direction Z. The first pillar 11 of this embodiment is made of an insulating pillar having a circular cross-section and extending in the direction including a component of the third direction Z (the third direction Z in this embodiment).

As the first pillar 11, for example, an insulator such as aluminum nitride, silicon nitride, aluminum oxide, silicon oxide, magnesium oxide, tantalum oxide, niobium oxide, hafnium oxide, zirconium oxide, germanium oxide, yttrium oxide, tungsten oxide, bismuth oxide, calcium oxide, aluminum oxynitride, silicon oxynitride, magnesium aluminum oxide, silicon boride, boron nitride, and sialon (oxynitride of silicon and aluminum) can be used.

A first end (the upper end in this embodiment) of the first pillar 11 in the extension direction (the third direction Z in this embodiment) is connected to the first wire 9 and a second end (the lower end in this embodiment) thereof in the extension direction is connected to the tip of the wiring layer 7 of the arm portion 7b. Accordingly, the thermistor element 4 is connected to the first substrate 2 via at least the first pillar 11. In this embodiment, the thermistor element 4 is connected to the first substrate 2 via the arm portion 7b, the first pillar 11, the first wire 9, and the first insulator layer 8.

Further, a first end and a second end of the first pillar 11 are electrically insulated from each other by including an insulator formed in at least a part (the entire portion in this embodiment) between the first end and the second end in the extension direction. Accordingly, the thermistor element 4 (the thermistor film 5 is electrically insulated from the first wire 9 connected to the first end of the first pillar 11 in the path passing through the first pillar 11 from the first end to the second end of the first pillar 11.

At least a part, of the second pillar 12 is made of an insulator and is located between the second wire 10 and the thermistor element 4 in the third direction Z. The second pillar 12 of this embodiment is made of an insulating pillar having a circular cross-section and extending in the direction including a component of the third direction Z (the third direction Z in this embodiment). The same insulator as that provided as an exemplary example of the first pillar 11 can be used for the second pillar 12.

A first end (the lower end in this embodiment) of the second pillar 12 in the extension direction (the third direction Z in this embodiment) is connected to the second wire 10 and a second end (the upper end in this embodiment) thereof in the extension direction is connected to the tip of the wiring layer 7 of the arm portion 7a. Accordingly, the second wire 10 is connected to the thermistor element 4 via at least the second pillar 12. In this embodiment, the second wire 10 is connected to the thermistor element 4 via the second pillar 12 and the an portion 7a.

Further, a first end and a second end of the second pillar 12 are electrically insulated from each other by including an insulator formed in at least a part (the entire portion in this embodiment) between the first end and the second end in the extension direction. Accordingly, the thermistor element 4 (the thermistor film 5) is electrically insulated from the second wire 10 in the path passing through the second pillar 12 from the first end to the second end of the second pillar 12.

The third pillar 13 is made of a conductor such as copper, gold, FeCoNi alloy or NiFe alloy (permalloy). At least a part of the third pillar 13 is located between the first substrate 2 and the thermistor element 4 in the third direction Z and is made of a conductive pillar having a circular cross-section and extending in the direction including a component of the third direction Z (the third direction Z in this embodiment).

The second pillar 12 and the third pillar 13 are located at the position in which at least a part (the entire portion in this embodiment) of them overlap each other in the plan view from the third direction Z. Further, a first end (the upper end in this embodiment) of the third pillar 13 is connected to the first wire 9 in the extension direction (the third direction Z in this embodiment) and a second end (the lower end in this embodiment) thereof in the extension direction is connected to the tip of the wiring layer 7 of the arm portion 7a. Accordingly, the thermistor element 4 is connected to the first substrate 2 via at least the third pillar 13. In this embodiment, the thermistor element 4 is connected to the first substrate 2 via the arm portion 7a, the third pillar 13, the first wire 9, and the first insulator layer 8.

Additionally, the first insulator layer 8 is partially removed so that the third pillar 13 and the first wire 9 are electrically connected. Further, the insulating film 6 provided on the upper surface of the wiring layer 7 constituting the arm portion 7a is partially removed so that the third pillar 13 and the wiring layer 7 of the arm portion 7a are electrically connected.

The thermistor element 4 and the pair of arm portions 7a and 7b are supported while being suspended in the third direction Z from the first substrate 2 by the first pillar 11 and the third pillar 13 located diagonally from the thermistor element 4 in the plan view from the third direction Z. Since the thermistor element 4 and the arm portions 7a and 7b are supported from the first substrate 2 by two pillars, that is, the first pillar 11 and the third pillar 13, the mechanical strength of this support structure is high. Further, a space G1 is provided between the thermistor element 4 and the first insulator layer 8 (between the thermistor element 4 and the first substrate 2).

The third pillar 13 has conductivity and is electrically connected to the first wire 9 and the thermistor element 4. That is, the thermistor element 4 (the thermistor film 5) is electrically connected to the first wire 9 via at least the third pillar 13.

The fourth pillar 14 is made of a conductor such as copper, gold, FeCoNi alloy or NiFe alloy (permalloy). At least a part of the fourth pillar 14 is located between the second wire 10 and the thermistor element 4 in the third direction Z and is made of a conductive pillar having a circular cross-section and extending in the direction having a component of the third direction Z (the third direction Z in this embodiment).

The first pillar 11 and the fourth pillar 14 are located at a position in which at least a part (the entire portion in this embodiment) of them overlap each other in the plan view from the third direction Z. Further, a first end (the lower end in this embodiment) of the fourth pillar 14 in the extension direction (the third direction Z in this embodiment) is connected to the second wire 10 and a second end (the upper end in this embodiment) thereof in the extension direction is connected to the tip of the wiring layer 7 of the arm portion 7b. Accordingly, the second wire 10 is connected to the thermistor element 4 via at least the fourth pillar 14. In this embodiment, the second wire 10 is connected to the thermistor element 4 via the fourth pillar 14 and the arm portion 7b. Additionally, the insulating film 6 provided on the lower surface of the wiring layer 7 constituting the arm portion 7b is partially removed so that the fourth pillar 14 and the wiring layer 7 of the arm portion 7b are electrically connected.

Since the second wire 10 is supported while being connected to the thermistor element 4 via the arm portions 7a and 7b by two pillars, that is, the second pillar 12 and the fourth pillar 14, the mechanical strength of this support structure is high.

The second wire 10 is supported while being suspended in the third direction 7 from the first substrate 2 by the second and third pillars 12 and 13 and the first and fourth pillars 11 and 14 located diagonally from the thermistor element 4 in the plan view from the third direction Z. Further, a space G2 is provided between the thermistor element 4 and the second wire 10.

The fourth pillar 14 has conductivity and is electrically connected to the second wire 10 and the thermistor element 4. That is, the thermistor element 4 (the thermistor film 5) is electrically connected to the second wire 10 via at least the fourth pillar 14.

In the electromagnetic wave sensor 1A of this embodiment, the second pillar 12 and the third pillar 13 are located at a position in which at least a part of them overlap each other and the first pillar 11 and the fourth pillar 14 are located at a position in which at least a part (the entire portion in this embodiment) of them overlap each other in the plan view from the third direction Z. Accordingly, the mechanical strength of the structure supporting the thermistor element 4 and the arm portions 7a and 7b or the second wire 10 is increased.

In the electromagnetic wave sensor 1A of this embodiment, each of the thermistor elements 4 is electrically connected to corresponding one of the first wires 9 via the third pillar 13 and each of the thermistor elements 4 is electrically connected to corresponding one of the second wires 10 via the fourth pillar 14.

The electromagnetic wave sensor 1A of this embodiment includes third, fourth, and fifth wires 15, 16, and 17 and fifth, sixth, and seventh pillars 18, 19, and 20 extending in the direction including at least a component of the third direction Z (the third direction Z in this embodiment).

The third wires 15 are made of, for example, a conductive film such as copper or gold and are provided on a surface side facing the second substrate 3 in the first substrate 2. That is, the third wires 15 are located on the first substrate side in relation to the second wire 10 in the third direction Z. The positions of the third wires 15 in the third direction Z are located between the position of the second wire 10 in the third direction Z and the position of the first substrate 2 in the third direction Z.

In this embodiment, the third wire 15 is located within the layer of the first insulator layer 8. Additionally, at least the surface of the third wire 15 may be exposed from the first insulator layer 8.

Each of the third wires 15 is electrically connected to corresponding one of the second wires 10. The third wires 15 are provided to extend in the second direction Y and to be arranged side by side at equal intervals in the first direction X in the plan view from the third direction Z.

In the example shown in FIGS. 1 and 3, each third wire 15 has a width smaller than that of one corresponding second wire 10 in the plan view from the third direction Z. Further, in the example shown in FIGS. 1 and 3, the thickness of each third wire 15 in the third direction Z is smaller than that of one corresponding second wire 10. Each third wire 15 includes a portion overlapping a first end side or a second end side of one corresponding second wire 10 in the plan view from the third direction Z. Further, each third wire 15 extends in a direction moving away from the second wire 10 from a portion overlapping one corresponding second wire 10 in the plan view from the third direction Z.

In this embodiment, the third wire 15 overlapping a first end side of the second wire 10 and the third wire 15 overlapping a second end side of the second wire 10 in the plan view from the third direction Z are alternately arranged in the first direction X. Additionally, the present disclosure is not limited to such a configuration and only the third wire 15 overlapping the first end side of the second wire 10 may be arranged in the first direction X or only the third wire 15 overlapping the second end side of the second wire 10 may be arranged in the first direction X.

The fifth pillar 18 is made of a conductor such as copper, gold, FeCoNi alloy or NiFe alloy (permalloy). At least a part of the fifth pillar 18 is located between the second wire 10 and the first substrate 2 in the third direction Z and is made of a conductive pillar having a circular cross-section and extending in the direction having a component of the third direction Z (the third direction Z in this embodiment). In this embodiment, the fifth pillar 18 is located between the second wire 10 and the third wire 15.

A first end (the lower end in this embodiment) of the fifth pillar 18 in the extension direction (the third direction Z in this embodiment) is connected to the second wire 10 and a second end (the upper end in this embodiment) thereof in the extension direction is connected to the third wire 15. Accordingly, the second wire 10 is connected to the first substrate 2 via at least the fifth pillar 18. In this embodiment, the second wire 10 is connected to the first substrate 2 via the fifth pillar 18, the third wire 15, and the first insulator layer 8. The second wire 10 is supported while being suspended in the third direction Z from the first substrate 2 by the fifth pillar 18. In this embodiment, the fifth pillar 18 is connected to the first end side or the second end side of the second wire 10. Additionally, the first insulator layer 8 is partially removed so that the fifth pillar 18 and the third wire 15 are electrically connected.

The fifth pillar 18 has conductivity and is electrically connected to the second wire 10 and the third wire 15. That is, the second wire 10 is electrically connected to the third wire 15 via at least the fifth pillar 18. Accordingly, the thermistor element 4 (the thermistor film 5) is electrically connected to the second wire 10 via at least the fourth pillar 14 and is electrically connected to the third wire 15 via at least the fourth pillar 14, the second wire 10, and the fifth pillar 18.

The fourth wires 16 are made of, for example, a conductive film such as copper or gold and are provided on a surface side facing the first substrate 2 in the second substrate 3. That is, the fourth wires 16 are located on the side opposite to the first substrate 2 (on the side of the second substrate 3) in relation to the second wire 10 in the third direction Z.

A second insulator layer 21 is provided on a surface side facing the first substrate 2 in the second substrate 3. The second insulator layer 21 is made of an insulating film formed on the side of one surface of the second substrate 3 (a surface facing the first substrate 2). The same material as provided as an exemplary example of the first insulator layer 8 can be used as the insulating film.

In this embodiment, the fourth wire 16 is located within the layer of the second insulator layer 21. Additionally, at least the surface of the fourth wire 16 may be exposed from the second insulator layer 21.

Each of the fourth wires 16 is electrically connected to corresponding one of the third wires 15. The fourth wires 16 are provided to extend in the second direction Y and to be arranged side by side at equal intervals in the first direction X in the plan view from the third direction Z.

Further, each fourth wire 16 includes a portion overlapping the side opposite to the connection side with the fifth pillar 18 in one corresponding third wire 15 in the plan view from the third direction Z. Further, each fourth wire 16 extends in a direction moving away from the third wire 15 from a portion overlapping one corresponding third wire 15 in the plan view from the third direction Z.

The sixth pillar 19 is made of a conductor such as copper, gold, FeCoNi alloy or NiFe alloy (permalloy). The sixth pillar 19 is located between the third wire 15 and the fourth wire 16 and is made of a conductive pillar having a circular cross-section and extending in the direction including a component of the third direction Z (the third direction Z in this embodiment).

A first end (the upper end in this embodiment) of the sixth pillar 19 in the extension direction (the third direction Z in this embodiment) is connected to the third wire 15 and a second end (the lower end in this embodiment) thereof in the extension direction is connected to the fourth wire 16. Additionally, the second insulator layer 21 is partially removed so that the sixth pillar 19 and the fourth wire 16 are electrically connected.

The sixth pillar 19 has conductivity and is electrically connected to the third wire 15 and the fourth wire 16. That is, the third wire 15 is electrically connected to the fourth wire 16 via at least the sixth pillar 19. Accordingly, the thermistor element 4 (the thermistor film 5) is electrically connected to the second wire 10 via at least the fourth pillar 14, is electrically connected to the third wire 15 via at least the fourth pillar 14, the second wire 10, and the fifth pillar 18, and is electrically connected to the fourth wire 16 via at least the fourth pillar 14, the second wire 10, the fifth pillar 18, the third wire 15, and the sixth pillar 19.

The fifth wires 17 are made of, for example, a conductive film such as copper or gold and are provided on a surface side facing the first substrate 2 in the second substrate 3. That is, the fifth wires 17 are located on the side opposite to the first substrate 2 (the side of the second substrate 3) in relation to the second wire 10 in the third direction Z.

In this embodiment, the fifth wire 17 is located within the layer of the second insulator layer 21. Additionally, at least the surface of the fifth wire 17 may be exposed from the second insulator layer 21.

Each of the fifth wires 17 is electrically connected to corresponding one of the first wires 9. The fifth wires 17 are provided to extend in the first direction X and to be arranged side by side at equal intervals in the second direction Y in the plan view from the third direction Z.

Further, each fifth wire 17 includes a portion overlapping a first end side or a second end side of one corresponding first wire 9 in the plan view from the third direction Z. Further, each fifth wire 17 extends in a direction moving away from the first wire 9 from a portion overlapping one corresponding first wire 9 in the plan view from the third direction Z.

In this embodiment, the fifth wire 17 overlapping a first end side of the first wire 9 and the fifth wire 17 overlapping a second end side of the first wire 9 in the plan view from the third direction Z are alternately arranged in the second direction Y. Additionally, the present disclosure is not limited to such a configuration and only the fifth wire 17 overlapping the first end side of the first wire 9 may be arranged in the second direction Y or only the fifth wire 17 overlapping the second end side of the first wire 9 may be arranged in the second direction Y.

The seventh pillar 20 is made of a conductor such as copper, gold. FeCoNi alloy or NiFe alloy (permalloy). The seventh pillar 20 is located between the first wire 9 and the fifth wire 17 and is made of a conductive pillar having a circular cross-section and extending in the direction having a component of the third direction Z (the third direction Z in this embodiment).

A first end (the upper end in this embodiment) of the seventh pillar 20 in the extension direction (the third direction 1 in this embodiment) is connected to the first wire 9 and a second end (the lower end in this embodiment) thereof in the extension direction is connected to the fifth wire 17. Additionally, the second insulator layer 21 is partially removed so that the seventh pillar 20 and the fifth wire 17 are electrically connected.

The seventh pillar 20 has conductivity and is electrically connected to the first wire 9 and the fifth wire 17. That is, the first wire 9 is electrically connected to the fifth wire 17 via at least the seventh pillar 20. Accordingly, the thermistor element 4 (the thermistor film 5) is electrically connected to the first wire 9 via at least the third pillar 13 and is electrically connected to the fifth wire 17 via at least the third pillar 13, the first wire 9, and the seventh pillar 20.

The fourth wires 16 and the fifth wires 17 constitute a part of a circuit portion (not shown) provided on a surface side facing the first substrate 2 in the second substrate 3. The circuit portion is configured to detect a change in the electric signal output from each thermistor element 4 and convert the detected change in the electric signal into a brightness temperature and consists of a readout integrated circuit (ROIC), a regulator, an A/D converter (Analog-to-Digital Converter), a multiplexer, and the like.

In the electromagnetic wave sensor 1A of this embodiment with the above-described configuration, infrared rays IR (electromagnetic waves to be detected) emitted from the measurement target are incident from the first substrate side. In the example shown in FIGS. 2 to 5, infrared rays IR (electromagnetic waves to be detected) emitted from the measurement target pass through the window portion W from the first substrate side and are incident to the thermistor element 4.

In the thermistor element 4, the temperature of the thermistor film 5 changes when infrared rays IR entering the insulating film 6 formed in the vicinity of the thermistor film 5 are absorbed by the insulating film 6 and infrared rays IR entering the thermistor film 5 are absorbed by the thermistor film 5. Further, in the thermistor element 4, the electrical resistance of the thermistor film 5 changes with the temperature change of the thermistor film 5 and hence the output voltage between the pair of first electrodes changes, in the electromagnetic wave sensor 1A of this embodiment, the thermistor element 4 functions as a bolometer element.

In the electromagnetic wave sensor 1A of this embodiment, when infrared rays IR emitted from the measurement target are two-dimensionally detected by the thermistor elements 4 and the electrical signal (voltage signal) output from each thermistor element 4 is converted into a brightness temperature, it is possible to two-dimensionally detect (image) the temperature distribution (temperature image) of the measurement target.

In the electromagnetic wave sensor 1A of this embodiment, a constant current is applied to the thermistor film 5 and a change in voltage output from the thermistor film 5 is detected with respect to the temperature change of the thermistor film 5. However, a configuration may be adopted in which a constant voltage is applied to the thermistor film 5 and a change in current flowing through the thermistor film 5 is detected with respect to the temperature change of the thermistor film 5 and is converted into a brightness temperature.

Incidentally, in the electromagnetic wave sensor 1A of this embodiment, the first wire 9 is located on the first substrate side in relation to the thermistor element 4 and the second wire 10 is located on the side opposite to the first substrate 2 in relation to the thermistor element 4 in the third direction Z.

Accordingly, in the electromagnetic wave sensor 1A of this embodiment, the space between the first wire 9 and the second wire 10 in the third direction Z can be widened with good space efficiency and the parasitic capacitance generated between the first wire 9 and the second wire 10 can be reduced.

Thus, in the electromagnetic wave sensor 1A of this embodiment, it is possible to obtain high operating speed and high detection accuracy.

Additionally, the electromagnetic wave sensor 1A includes the third wire 15 and the fifth pillar 18, but for example, as shown in FIG. 7, the third wire 15 and the fifth pillar 18 may be omitted and the second wire 10 and the fourth wire 16 may be electrically connected via the sixth pillar 19.

Specifically, in the configuration shown in FIG. 7, a first end side or a second end side of the second wire 10 extends to a position overlapping the sixth pillar 19 to be connected to the sixth pillar 19 in the plan view from the third direction Z. At least a part of the sixth pillar 19 is located between the second wire 10 and the second substrate 3 in the third direction Z. Accordingly, the second wire 10 is connected to the second substrate 3 via at least the sixth pillar 19. In this embodiment, the second wire 10 is connected to the second substrate 3 via the sixth pillar 19, the fourth wire 16, and the second insulator layer 21. The sixth pillar 19 has conductivity and is electrically connected to the second wire 10 and the fourth wire 16.

Additionally, in the configuration shown in FIG. 7, a first end (upper end) of the sixth pillar 19 in the extension direction is connected to the first insulator layer 8 and a second end (lower end) thereof in the extension direction is connected to the fourth wire 16. However, a first end (upper end) of the sixth pillar 19 in the extension direction may be connected to the second wire 10 and a second end (lower end) thereof in the extension direction may be connected to the fourth wire 16.

Second Embodiment

Next, an electromagnetic wave sensor 1B, for example, shown in FIG. 8 will be described as a second embodiment of the present disclosure.

Figure 8:
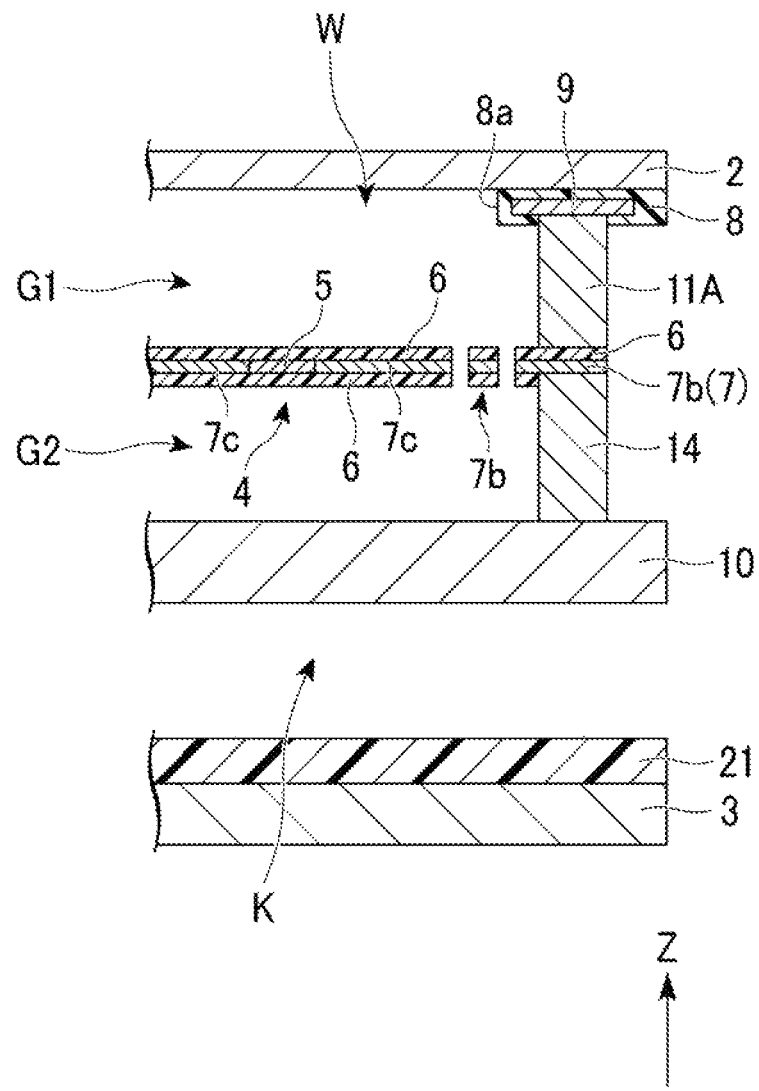
FIG. 8 is a cross-sectional view showing the configuration of an electromagnetic wave sensor according to a second embodiment of the present disclosure.

Additionally, FIG. 8 is a cross-sectional view showing a configuration of the electromagnetic wave sensor 1B. Further, in the following description, description of parts equivalent to those of the electromagnetic wave sensor 1A will be omitted and the same reference numerals will be given in the drawings. Additionally, FIG. 8 shows a pan of the cross-section of the electromagnetic wave sensor 1B corresponding to line segment D-D shown in FIG. 1.

As shown in FIG. 8, the electromagnetic wave sensor 1B of this embodiment includes a first pillar 11A instead of the first pillar 11.

The first pillar 11A is made of a conductor such as copper, gold, FeCoNi alloy or NiFe alloy (permalloy). At least a part, of the first pillar 11A is located between the first substrate 2 and the thermistor element 4 in the third direction Z and is made of a conductive pillar having a circular cross-section and extending in the direction including a component of the third direction Z (the third direction Z in this embodiment).

A first end (the upper end in this embodiment) of the first pillar 11A in the extension direction (the third direction Z in this embodiment) is connected to the first wire 9 and a second end (the lower end in this embodiment) thereof in the extension direction is connected to the insulating film 6 provided on the upper surface of the wiring layer 7 constituting the arm portion 7b. Accordingly, the thermistor element 4 is connected to the first substrate 2 via at least the first pillar 11A. In this embodiment, the thermistor element 4 is connected to the first substrate 2 via the arm portion 7b, the insulating film 6, the first pillar 11A, the first wire 9, and the first insulator layer 8.

At least a first end (the lower end in this embodiment) of the first pillar 11A is connected to the insulator (the insulating film 6 in this embodiment). Accordingly, the thermistor element 4 (the thermistor film 5) is electrically insulated from the first wire 9 connected to the upper end of the first pillar 11A in the path passing through the first pillar 11A from the first end to a second end of the first pillar 11A.

As for the other configurations, the electromagnetic wave sensor 1B of this embodiment basically has the same configuration as that of the electromagnetic wave sensor 1A. Thus, since the electromagnetic wave sensor 1B of this embodiment has such a configuration, it is possible to obtain high operating speed and high detection accuracy as in the electromagnetic wave sensor 1A of the first embodiment.

Third Embodiment

Next, an electromagnetic wave sensor 1C, for example, shown in FIG. 9 will be described as a third embodiment of the present disclosure.

Additionally, FIG. 9 is a cross-sectional view showing a configuration of the electromagnetic wave sensor 1C. Further, in the following description, description of parts equivalent to those of the electromagnetic wave sensor 1A will be omitted and the same reference numerals will be given in the drawings. Additionally, FIG. 9 shows a part of the cross-section of the electromagnetic wave sensor 1C corresponding to line segment D-D shown in FIG. 1.

As shown in FIG. 9, the electromagnetic wave sensor 1C of this embodiment includes a second pillar 12A instead of the second pillar 12.

The second pillar 12A is made of a conductor such as copper, gold, FeCoNi alloy or NiFe alloy (permalloy). At least a part of the second pillar 12A is located between the second wire 10 and the thermistor element 4 in the third direction Z and is made of a conductive pillar having a circular cross-section and extending in the direction having a component of the third direction Z (the third direction Z in this embodiment).

A first end (the lower end in this embodiment) of the second pillar 12A in the extension direction (the third direction Z in this embodiment) is connected to the second wire 10 and a second end (the upper end in this embodiment) thereof in the extension direction is connected to the insulating film 6 provided on the lower surface of the wiring layer 7 constituting the arm portion 7a. Accordingly, the second wire 10 is connected to the thermistor element 4 via at least the second pillar 12A. In this embodiment, the second wire 10 is connected to the thermistor element 4 via the second pillar 12A, the insulating film 6, and the arm portion 7a.

At least a first end (the upper end in this embodiment) of the second pillar 12A is connected to the insulator (the insulating film 6 in this embodiment). Accordingly, the thermistor element 4 (the thermistor film 5) is electrically insulated from the second wire 10 in the path passing through the second pillar 12A from the first end to a second end of the second pillar 12A.

As for the other configurations, the electromagnetic wave sensor 1C of this embodiment basically has the same configuration as that of the electromagnetic wave sensor 1A. Thus, since the electromagnetic wave sensor 1C of this embodiment has such a configuration, it is possible to obtain high operating speed and high detection accuracy as in the electromagnetic wave sensor 1A of the first embodiment.

Fourth Embodiment

Next, an electromagnetic wave sensor 1D, for example, shown in FIG. 10 will be described as a fourth embodiment of the present disclosure.

Additionally, FIG. 10 is a cross-sectional view showing a configuration of the electromagnetic wave sensor 1D. Further, in the following description, description of parts equivalent to those of the electromagnetic wave sensors 1A and 1B will be omitted and the same reference numerals will be given in the drawings. Additionally, FIG. 10 shows a part of the cross-section of the electromagnetic wave sensor 1D corresponding to line segment D-D shown in FIG. 1.

As shown in FIG. 10, the electromagnetic wave sensor 1D of this embodiment includes a first pillar 11A instead of the first pillar 11. The configuration of the first pillar 11A itself is the same as that of the first pillar 11A of the electromagnetic wave sensor 1B.

A first end (the upper end in this embodiment) of the first pillar 11A in the extension direction (the third direction Z in this embodiment) is connected to the first insulator layer 8 covering the first wire 9 and a second end (the lower end in this embodiment) in the extension direction is connected to the tip of the wiring layer 7 constituting the arm portion 7b. Accordingly, the thermistor element 4 is connected to the first substrate 2 via at least the first pillar 11A. In this embodiment, the thermistor element 4 is connected to the first substrate 2 via the arm portion 7b, the first pillar 11A, the first insulator layer 8, and the first wire 9.

At least a first end (the upper end in this embodiment) of the first pillar 11A is connected to the insulator (the first insulator layer 8 in this embodiment). Accordingly, the thermistor element 4 (the thermistor film 5) is electrically insulated from the first wire 9 overlapping the first pillar 11A in the plan view from the third direction Z in the path passing through the first pillar 11A from the first end to a second end of the first pillar 11A.

As for the other configurations, the electromagnetic wave sensor 1D of this embodiment basically has the same configuration as that of the electromagnetic wave sensor 1A. Thus, since the electromagnetic wave sensor 1D of this embodiment has such a configuration, it is possible to obtain high operating speed and high detection accuracy as in the electromagnetic wave sensor 1A of the first embodiment.

Fifth Embodiment

Next, an electromagnetic wave sensor 1E, for example, shown in FIG. 11 will be described as a fifth embodiment of the present disclosure.

Additionally, FIG. 11 is a cross-sectional view showing a configuration of the electromagnetic wave sensor 1E. Further, in the following description, description of parts equivalent to those of the electromagnetic wave sensors 1A and 1C will be omitted and the same reference numerals will be given in the drawings. Additionally, FIG. 11 shows a part of the cross-section of the electromagnetic wave sensor 1E corresponding to line segment D-D shown in FIG. 1.

As shown in FIG. 11, the electromagnetic wave sensor 1E of this embodiment includes a second pillar 12A instead of the second pillar 12. The configuration of the second pillar 12A itself is the same as that of the second pillar 12A of the electromagnetic wave sensor 1C.

A first end (the lower end in this embodiment) of the second pillar 12A in the extension direction (the third direction Z in this embodiment) is connected to the insulating film 22 covering a part of the upper surface of the second wire 10 and a second end (the upper end in this embodiment) thereof in the extension direction is connected to the tip of the wiring layer 7 constituting the arm portion 7a. The same material as exemplified for the insulating film 6 can be used as the insulating film 22. Accordingly, the second wire 10 is connected to the thermistor element 4 via at least the second pillar 12A. In this embodiment, the second wire 10 is connected to the thermistor element 4 via the insulating film 22, the second pillar 12A, and the arm portion 7a.

At least a first end (the lower end in this embodiment) of the second pillar 12A is connected to the insulator (the insulating film 22 in this embodiment). Accordingly, the thermistor element 4 (the thermistor film 5) is electrically insulated from the second wire 10 in the path passing through the second pillar 12A from a first end to a second end of the second pillar 12A.

As for the other configurations, the electromagnetic wave sensor 1E of this embodiment basically has the same configuration as that of the electromagnetic wave sensor 1A. Thus, since the electromagnetic wave sensor 1E of this embodiment has such a configuration, it is possible to obtain high operating speed and high detection accuracy as in the electromagnetic wave sensor 1A of the first embodiment.

Sixth Embodiment

Next, an electromagnetic wave sensor 1F, for example, shown in FIG. 12 will be described as a sixth embodiment of the present disclosure.

Figure 12:
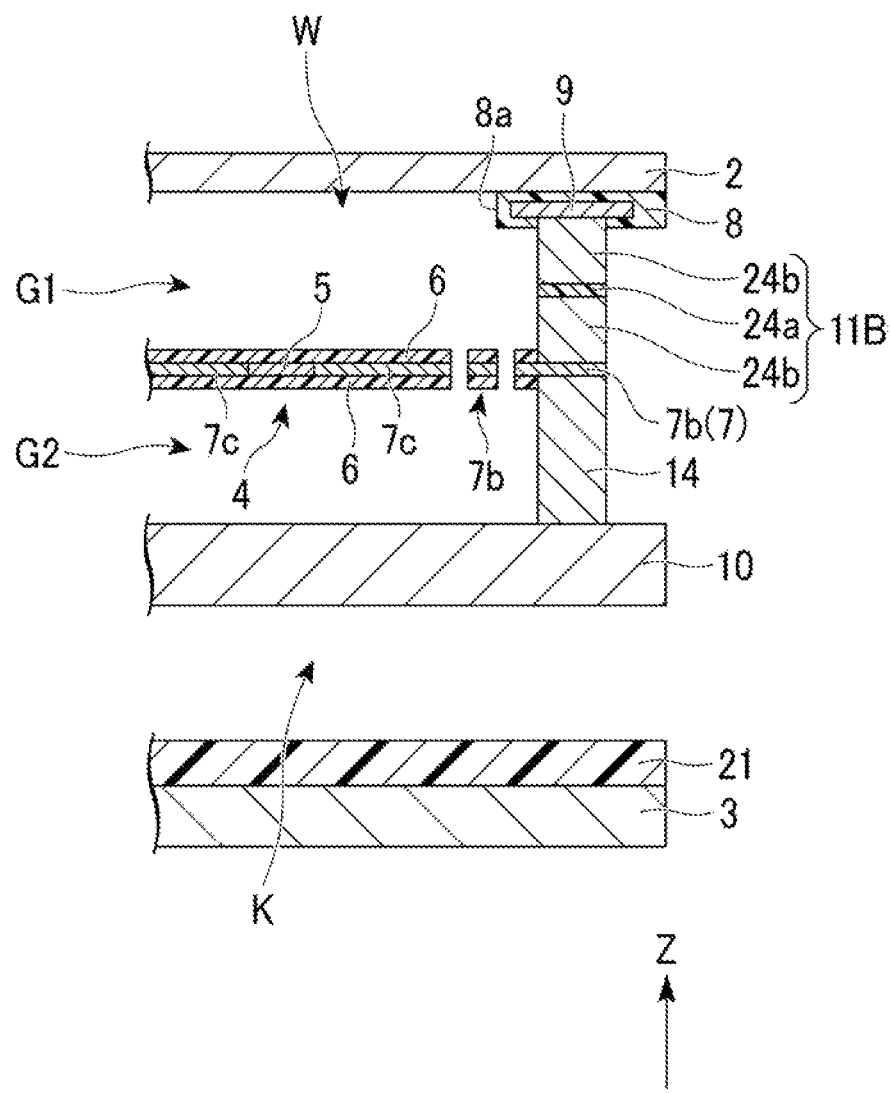
FIG. 12 is a cross-sectional view showing the configuration of an electromagnetic wave sensor according to a sixth embodiment of the present disclosure.

Additionally, FIG. 12 is a cross-sectional view showing a configuration of the electromagnetic wave sensor 1F. Further, in the following description, description of parts equivalent to those of the electromagnetic wave sensor 1A will be omitted and the same reference numerals will be given in the drawings. Additionally, FIG. 12 shows a part of the cross-section of the electromagnetic wave sensor 1F corresponding to line segment D-D shown in FIG. 1.

As shown in FIG. 12, the electromagnetic wave sensor 1F of this embodiment includes a first pillar 11B instead of the first pillar 11.

The first pillar 11B includes an insulator 23a which is provided in a part between a first end and a second end of the extension direction (the third direction Z in this embodiment) and a conductor 23b which is provided to sandwich the insulator 23a. The same insulator as that exemplified for the first pillar 11 can be used for the insulator 23a of the first pillar 11B. Further, the same conductor as that exemplified for the first pillar 11A can be used for the conductor 23b of the first pillar 11B.

A first end (the upper end in this embodiment) of the first pillar 11B in the extension direction is connected to the first wire 9 and a second end (the lower end in this embodiment) thereof in the extension direction is connected to the tip of the wiring layer 7 constituting the arm portion 7b. Accordingly, the thermistor element 4 is connected to the first substrate 2 via at least the first pillar 11B. In this embodiment, the thermistor element 4 is connected to the first substrate 2 via the arm portion 7b, the first pillar 11B, the first wire 9, and the first insulator layer 8.

A first end and a second end of the first pillar 11B are electrically insulated from each other by including the insulator 23a in a part between the first end and the second end in the extension direction. Accordingly, the thermistor element 4 (the thermistor film 5) is electrically insulated from the first wire 9 connected to the first end of the first pillar 11B in the path passing through the first pillar 11B from the first end to the second end of the first pillar 11B.

As for the other configurations, the electromagnetic wave sensor 1F of this embodiment basically has the same configuration as that of the electromagnetic wave sensor 1A. Thus, since the electromagnetic wave sensor 1F of this embodiment has such a configuration, it is possible to obtain high operating speed and high detection accuracy as in the electromagnetic wave sensor 1A of the first embodiment.

Seventh Embodiment

Next, an electromagnetic wave sensor 1G, for example, shown in FIG. 13 will be described as a seventh embodiment of the present disclosure.

Figure 13:
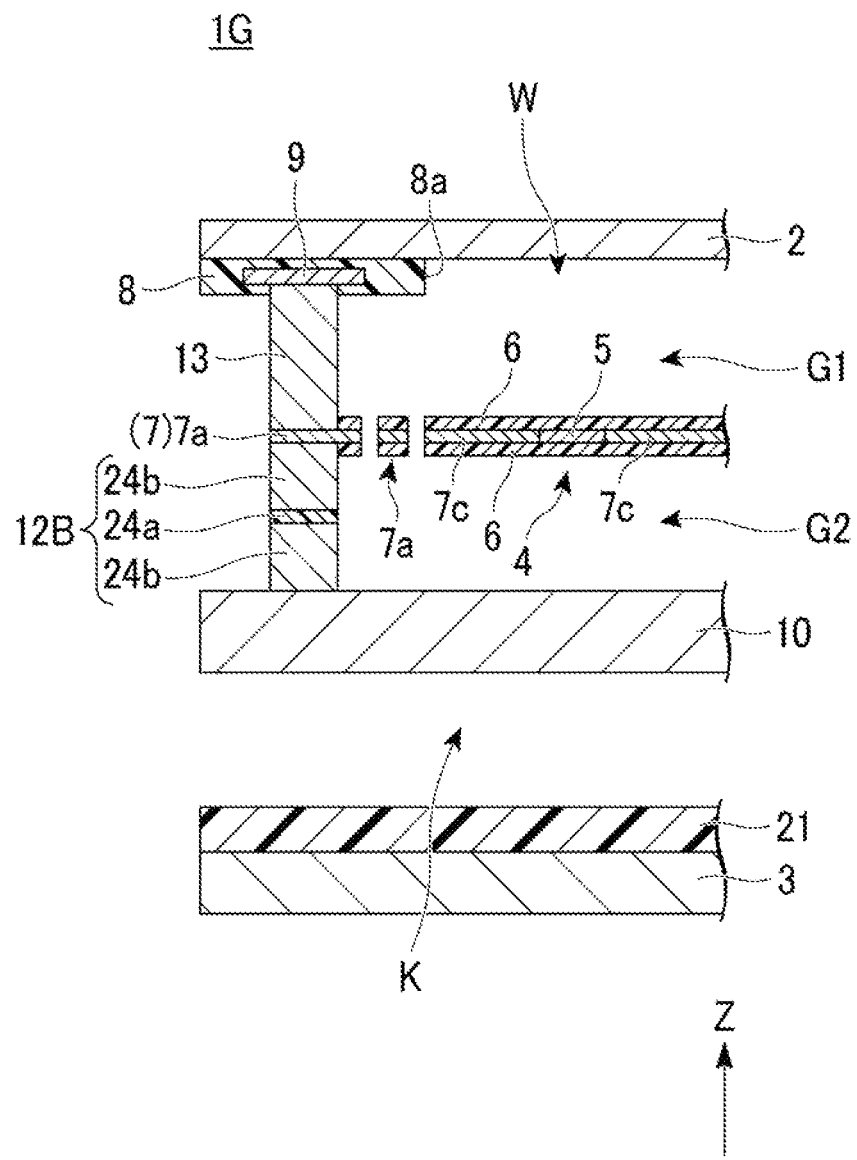
FIG. 13 is a cross-sectional view showing the configuration of an electromagnetic wave sensor according to a seventh embodiment of the present disclosure.

Additionally, FIG. 13 is a cross-sectional view showing a configuration of the electromagnetic wave sensor 1G. Further, in the following description, description of parts equivalent to those of the electromagnetic wave sensor 1A will be omitted and the same reference numerals will be given in the drawings. Additionally, FIG. 13 shows a pan of the cross-section of the electromagnetic wave sensor 1G corresponding to line segment D-D shown in FIG. 1.

As shown in FIG. 13, the electromagnetic wave sensor 1G of this embodiment includes a second pillar 12B instead of the second pillar 12.

The second pillar 12B includes an insulator 24a provided in a pan between a first end and a second end in the extension direction (the third direction Z in this embodiment) and a conductor 24b provided to sandwich the insulator 24a. The same insulator as that exemplified for the second pillar 12 can be used for the insulator 24a of the second pillar 12B. Further, the same conductor as that exemplified for the second pillar 12A can be used for the conductor 24b of the second pillar 12B.

A first end (the lower end in this embodiment) of the second pillar 12B in the extension direction is connected to the second wire 10 and a second end (the upper end in this embodiment) thereof in the extension direction is connected to the tip of the wiring layer 7 constituting the arm portion 7a. Accordingly, the second wire 10 is connected to the thermistor element 4 via at least the second pillar 12B. In this embodiment, the second wire 10 is connected to the thermistor element 4 via the second pillar 12B and the arm portion 7a.

A first end and a second end of the second pillar 123 are electrically insulated from each other by including the insulator 24a in a pan between the first end and the second end in the extension direction. Accordingly, the thermistor element 4 (the thermistor film 5) is electrically insulated from the second wire 10 in the path passing through the second pillar 12B from the first end to the second end of the second pillar 12B.

As for the other configurations, the electromagnetic wave sensor 1G of this embodiment basically has the same configuration as that of the electromagnetic wave sensor 1A. Thus, since the electromagnetic wave sensor 1G of this embodiment has such a configuration, it is possible to obtain high operating speed and high detection accuracy as in the electromagnetic wave sensor 1A of the first embodiment.

Eighth Embodiment

Next, an electromagnetic wave sensor 1H, for example, shown in FIG. 14 will be described as an eighth embodiment of the present disclosure.

Figure 14:
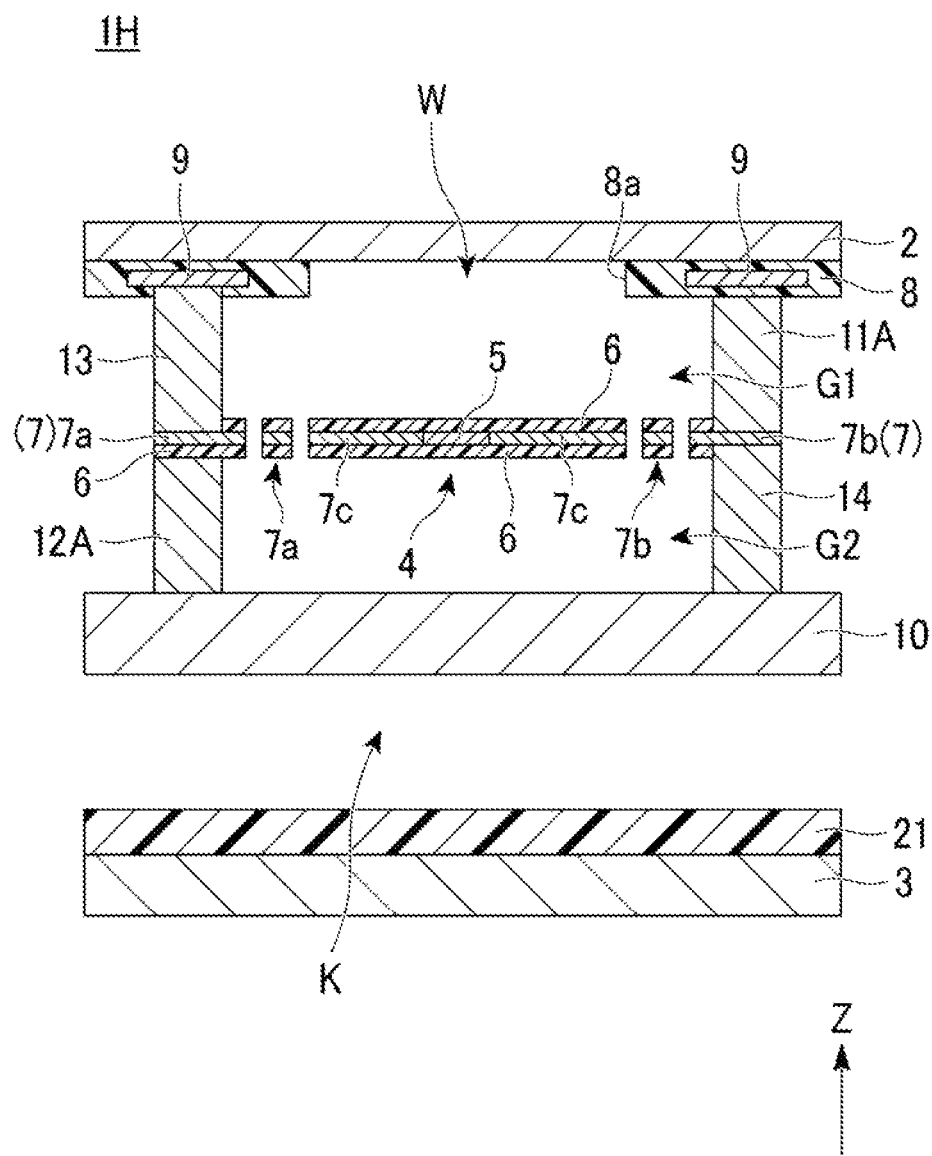
FIG. 14 is a cross-sectional view showing the configuration of an electromagnetic wave sensor according to an eighth embodiment of the present disclosure.

Additionally, FIG. 14 is a cross-sectional view showing a configuration of the electromagnetic wave sensor 1H. Further, in the following description, description of parts equivalent to those of the electromagnetic wave sensors 1A, 1B, and 1C will be omitted and the same reference numerals will be given in the drawings. Additionally, FIG. 14 shows a cross-section of the electromagnetic wave sensor 1H corresponding to line segment D-D shown in FIG. 1.

The configurations of the electromagnetic wave sensors 1B to 1G shown in the second to seventh embodiments are configurations in which the first pillar 11 or the second pillar 12 is individually changed compared to the configuration of the electromagnetic wave sensor 1A shown in the first embodiment. On the other hand, the first pillar 11 or the second pillar 12 can be changed by appropriately combining any one configuration of the electromagnetic wave sensors 1B, 1D, and 1F shown in the second, fourth, and sixth embodiments and any one configuration of the electromagnetic wave sensors 1C, 1E, and 1G shown in the third, fifth, and seventh embodiments with respect to the configuration of the electromagnetic wave sensor 1A shown in the first embodiment.

For example, the electromagnetic wave sensor 1H shown in FIG. 14 has a configuration changed by combining the configurations of the electromagnetic wave sensors 1C and 1D with the configuration of the electromagnetic wave sensor 1A.

Specifically, the electromagnetic wave sensor 1H includes the first pillar 11A instead of the first pillar 11 and includes the second pillar 12A instead of the second pillar 12. The configuration of the first pillar 11A itself is the same as that of the first pillar 11A of the electromagnetic wave sensor 1B.

The configuration of the second pillar 12A itself is the same as that of the second pillar 12A of the electromagnetic wave sensor 1C.

A first end (the upper end in this embodiment) of the first pillar 11A in the extension direction (the third direction Z in this embodiment) is connected to the first insulator layer 8 covering the first wire 9 and a second end (the lower end in this embodiment) thereof in the extension direction is connected to the tip of the wiring layer 7 constituting the arm portion 7b.

At least a first end (the upper end in this embodiment) of the first pillar 11A is connected to the insulator (the first insulator layer 8 in this embodiment). Accordingly, the thermistor element 4 (the thermistor film 5) is electrically insulated from the first wire 9 overlapping the first pillar 11A in the plan view from the third direction Z in the path passing through the first pillar 11A from the first end to a second end of the first pillar 11A.

A first end (the lower end in this embodiment) of the second pillar 12A in the extension direction (the third direction Z in this embodiment) is connected to the second wire 10 and a second end (the upper end in this embodiment) thereof in the extension direction is connected to the insulating film 6 provided on the lower surface of the wiring layer 7 constituting the arm portion 7a.

At least a first end (the upper end in this embodiment) of the second pillar 12A is connected to the insulator (the insulating film 6 in this embodiment). Accordingly, the thermistor element 4 (the thermistor film 5) is electrically insulated from the second wire 10 in the path passing through the second pillar 12A from the first end to a second end of the second pillar 12A.

As for the other configurations, the electromagnetic wave sensor 1H of this embodiment basically has the same configuration as that of the electromagnetic wave sensor 1A. Thus, since the electromagnetic wave sensor 1H of this embodiment has such a configuration, it is possible to obtain high operating speed and high detection accuracy as in the electromagnetic wave sensor 1A of the first embodiment.

Ninth Embodiment

Next, an electromagnetic wave sensor 1J, for example, shown in FIG. 15 will be described as an eighth embodiment of the present disclosure.

Additionally, FIG. 14 is a plan view schematically showing a configuration of the electromagnetic wave sensor 1J. Further, in the following description, description of parts equivalent to those of the electromagnetic wave sensor 1A will be omitted and the same reference numerals will be given in the drawings.

As shown in FIG. 14, the electromagnetic wave sensor 1J of this embodiment has a structure in which the thermistor elements 4 are arranged in a row.

That is, the electromagnetic wave sensor 1J includes one second wire 10 and the first wires 9. Further, in the electromagnetic wave sensor 1J, the thermistor elements 4 are arranged side by side in the second direction Y in the plan view from the direction (the third direction Z) perpendicular to the substrate surface of the first substrate 2. Further, the first wires 9 are arranged side by side in the second direction Y so that each of the thermistor elements 4 is electrically connected to corresponding one of the first wires 9 in the plan view from the third direction Z. Further, each of the thermistor elements 4 is electrically connected to one second wire 10.

The electromagnetic wave sensor 1J of this embodiment includes one second wire 10 and the first wires 9, but may have a configuration in which one first wire 9 and the second wires 10 are provided and the thermistor elements 4 are arranged side by side in the first direction X in the plan view from the direction (the third direction Z) perpendicular to the substrate surface of the first substrate 2.

In this case, the second wires 10 are arranged side by side in the first direction X so that each of the thermistor elements 4 is electrically connected to corresponding one of the second wires 10 in the plan view from the third direction Z and each of the thermistor elements 4 is electrically connected to one first wire 9.

The electromagnetic wave sensor 1J may have the configurations of the electromagnetic wave sensors 1A to 1H. Thus, since the electromagnetic wave sensor 1J of this embodiment has such a configuration, it is possible to obtain high operating speed and high detection accuracy as in the electromagnetic wave sensor 1A of the first embodiment.

Additionally, the present disclosure is not necessarily limited to the above-described embodiments and can be modified into various forms in the scope not departing from the spirit of the present disclosure.

For example, the electromagnetic wave sensor that adopts the present disclosure is not necessarily limited to the configuration of the infrared image sensor in which the thermistor elements 4 are arranged in a two-dimensional array or in one row and the present disclosure can be applied to the electromagnetic wave sensor or the like that uses one thermistor element 4.

Further, the electromagnetic wave sensor that adopts the present disclosure is not necessarily limited to the one that detects infrared rays IR as electromagnetic waves and, for example, may be one that detects a terahertz wave having a wavelength of 30 μm or more and 3 mm or less.

Further, the electromagnetic wave sensor that adopts the present disclosure is not necessarily limited to the one using the thermistor element 4 as the electromagnetic wave detector and, for example, one that uses a thermopile (thermocouple) type, pyroelectric type, or diode type temperature sensing element instead of the thermistor film 5 can be used as the electromagnetic wave detector.

What is claimed is:
1. An electromagnetic wave sensor comprising:
a first substrate;
one or more first wires each of which extends in a first direction parallel to a substrate surface of the first substrate in a plan view from a direction perpendicular to the substrate surface;
one or more second wires each of which extends in a second direction parallel to the substrate surface and different from the first direction in the plan view; and
electromagnetic wave detectors each of which is electrically connected to corresponding one of the one or more first wires and is electrically connected to corresponding one of the one or more second wires,
wherein positions of the one or more first wires in a third direction orthogonal to the first direction and the second direction are located between positions of the electromagnetic wave detectors in the third direction and a position of the first substrate in the third direction,
wherein the positions of the electromagnetic wave detectors in the third direction are between positions of the one or more second wires in the third direction and the position of the first substrate in the third direction, wherein either wires of the one or more first wires or the one or more second wires comprise a plurality of either wires, wherein in the plan view, the electromagnetic wave detectors are arranged side by side in a direction in which the either wires are arranged side by side, and wherein in the plan view, the either wires are arranged side by side in the first direction or the second direction.

2. The electromagnetic wave sensor according to claim 1, further comprising:

a first pillar which extends in a direction including at least a component of the third direction, wherein a position of at least a part of the first pillar in the third direction is located between the position of the first substrate in the third direction and the positions of the electromagnetic wave detectors in the third direction, wherein one of the electromagnetic wave detectors is connected to the first substrate via at least the first pillar, and wherein at least a first end of the first pillar is connected to an insulator; or a first end and a second end of the first pillar are electrically insulated from each other by including an insulator in at least a part between the first end and the second end.

3. The electromagnetic wave sensor according to claim 2, further comprising:

a third pillar which extends in a direction including at least a component of the third direction, wherein a position of at least a part of the third pillar in the third direction is located between the position of the first substrate in the third direction and the positions of the electromagnetic wave detectors in the third direction, and wherein the one of the electromagnetic wave detectors is connected to the first substrate via at least the third pillar and the third pillar has conductivity and is electrically connected to one of the one or more first wires and the one of the electromagnetic wave detectors.

4. The electromagnetic wave sensor according to claim 2, further comprising:

a fourth pillar which extends in a direction including at least a component of the third direction, wherein a position of at least a part of the fourth pillar in the third direction is located between the positions of the one or more second wires in the third direction and the positions of the electromagnetic wave detectors in the third direction, wherein the fourth pillar has conductivity and is electrically connected to one of the one or more second wires and the one of the electromagnetic wave detectors, and wherein the first pillar and the fourth pillar are located at a position in which at least a part of them overlap each other in a plan view from the third direction.

5. The electromagnetic wave sensor according to claim 1, further comprising:

a second pillar which extends in a direction including at least a component of the third direction, wherein a position of at least a part of the second pillar in the third direction is located between the positions of the one or more second wires in the third direction and the positions of the electromagnetic wave detectors in the third direction, wherein one of the electromagnetic wave detectors is connected to one of the one or more second wires via at least the second pillar, and wherein at least a first end of the second pillar is connected to an insulator; or a first end and a second end of the second pillar are electrically insulated from each other by including an insulator in at least a part between the first end and the second end.

6. The electromagnetic wave sensor according to claim 5, further comprising:

a fourth pillar which extends in a direction including at least a component of the third direction, wherein a position of at least a part of the fourth pillar in the third direction is located between the positions of the one or more second wires in the third direction and the positions of the electromagnetic wave detectors in the third direction, and wherein the fourth pillar has conductivity and is electrically connected to the one of the one or more second wires and the one of the electromagnetic wave detectors.

7. The electromagnetic wave sensor according to claim 5, further comprising:

a third pillar which extends in a direction including at least a component of the third direction, wherein a position of at least a part of the third pillar in the third direction is located between the position of the first substrate in the third direction and the positions of the electromagnetic wave detectors in the third direction, wherein the third pillar has conductivity and is electrically connected to one of the one or more first wires and the one of the electromagnetic wave detectors, and wherein the second pillar and the third pillar are located at a position in which at least a part of them overlap each other in a plan view from the third direction.

8. The electromagnetic wave sensor according to claim 1, wherein one of the one or more second wires includes a portion overlapping one of the electromagnetic wave detectors in a plan view from the third direction.

9. The electromagnetic wave sensor according to claim 1, further comprising:

a third wire; and a fifth pillar which extends in a direction including at least a component of the third direction, wherein a position of the third wire is located between the positions of the one or more second wires in the third direction and the position of the first substrate in the third direction, wherein a position of at least a part of the fifth pillar is located between the positions of the one or more second wires in the third direction and the position of the first substrate in the third direction, wherein one of the one or more second wires is connected to the first substrate via at least the fifth pillar, and wherein the fifth pillar has conductivity and is electrically connected to the one of the one or more second wires and the third wire.

10. The electromagnetic wave sensor according to claim 1, further comprising:

a fourth wire; and a second substrate which faces the first substrate; and a sixth pillar which extends in a direction including at least a component of the third direction, wherein the one or more second wires are located between the first substrate and the second substrate, and the positions of the one or more second wires in the third direction are between a position of the fourth wire in the third direction and the position of the first substrate in the third direction, wherein a position of at least a part of the sixth pillar in the third direction is located between the positions of the one or more second wires in the third direction and a position of the second substrate in the third direction, wherein one of the one or more second wires is connected to the second substrate via at least the sixth pillar, and wherein the sixth pillar has conductivity and is electrically connected to the one of the one or more second wires and the fourth wire.

11. An electromagnetic wave sensor comprising:
a first substrate;
first wires each of which extends in a first direction parallel to a substrate surface of the first substrate in a plan view from a direction perpendicular to the substrate surface;
second wires each of which extends in a second direction parallel to the substrate surface and different from the first direction in the plan view; and
electromagnetic wave detectors each of which is electrically connected to corresponding one of the first wires and is electrically connected to corresponding one of the second wires,
wherein positions of the first wires in a third direction orthogonal to the first direction and the second direction are located between positions of the electromagnetic wave detectors in the third direction and a position of the first substrate in the third direction,
wherein the positions of the electromagnetic wave detectors in the third direction are between positions of the second wires in the third direction and the position of the first substrate in the third direction,
wherein in the plan view, the electromagnetic wave detectors are arranged side by side in a two-dimensional array in the first direction and the second direction,
wherein in the plan view, the first wires are arranged side by side in the second direction, and
wherein in the plan view, the second wires are arranged side by side in the first direction.

12. The electromagnetic wave sensor according to claim 11, further comprising:
a first pillar which extends in a direction including at least a component of the third direction,
wherein a position of at least a part of the first pillar in the third direction is located between the position of the first substrate in the third direction and the positions of the electromagnetic wave detectors in the third direction,
wherein one of the electromagnetic wave detectors is connected to the first substrate via at least the first pillar, and
wherein at least a first end of the first pillar is connected to an insulator; or a first end and a second end of the first pillar are electrically insulated from each other by including an insulator in at least a part between the first end and the second end.

13. The electromagnetic wave sensor according to claim 12, further comprising:
a third pillar which extends in a direction including at least a component of the third direction,
wherein a position of at least a part of the third pillar in the third direction is located between the position of the first substrate in the third direction and the positions of the electromagnetic wave detectors in the third direction, and
wherein the one of the electromagnetic wave detectors is connected to the first substrate via at least the third pillar and the third pillar has conductivity and is electrically connected to one of the first wires and the one of the electromagnetic wave detectors.

14. The electromagnetic wave sensor according to claim 12, further comprising:
a fourth pillar which extends in a direction including at least a component of the third direction,
wherein a position of at least a part of the fourth pillar in the third direction is located between the positions of the second wires in the third direction and the positions of the electromagnetic wave detectors in the third direction,
wherein the fourth pillar has conductivity and is electrically connected to one of the second wires and the one of the electromagnetic wave detectors, and
wherein the first pillar and the fourth pillar are located at a position in which at least a part of them overlap each other in a plan view from the third direction.

15. The electromagnetic wave sensor according to claim 11, further comprising:
a second pillar which extends in a direction including at least a component of the third direction,
wherein a position of at least a part of the second pillar in the third direction is located between the positions of the second wires in the third direction and the positions of the electromagnetic wave detectors in the third direction,
wherein one of the electromagnetic wave detectors is connected to one of the second wires via at least the second pillar, and
wherein at least a first end of the second pillar is connected to an insulator; or a first end and a second end of the second pillar are electrically insulated from each other by including an insulator in at least a part between the first end and the second end.

16. The electromagnetic wave sensor according to claim 15, further comprising:
a fourth pillar which extends in a direction including at least a component of the third direction,
wherein a position of at least a part of the fourth pillar in the third direction is located between the positions of the second wires in the third direction and the positions of the electromagnetic wave detectors in the third direction, and
wherein the fourth pillar has conductivity and is electrically connected to the one of the second wires and the one of the electromagnetic wave detectors.

17. The electromagnetic wave sensor according to claim 15, further comprising:
a third pillar which extends in a direction including at least a component of the third direction,
wherein a position of at least a part of the third pillar in the third direction is located between the position of the first substrate in the third direction and the positions of the electromagnetic wave detectors in the third direction,
wherein the third pillar has conductivity and is electrically connected to one of the first wires and the one of the electromagnetic wave detectors, and
wherein the second pillar and the third pillar are located at a position in which at least a part of them overlap each other in a plan view from the third direction.

18. The electromagnetic wave sensor according to claim 11,
wherein one of the second wires includes a portion overlapping one of the electromagnetic wave detectors in a plan view from the third direction.

19. The electromagnetic wave sensor according to claim 11, further comprising:
a third wire; and
a fifth pillar which extends in a direction including at least a component of the third direction,
wherein a position of the third wire is located between the positions of the second wires in the third direction and the position of the first substrate in the third direction,
wherein a position of at least a part of the fifth pillar is located between the positions of the second wires in the third direction and the position of the first substrate in the third direction,
wherein one of the second wires is connected to the first substrate via at least the fifth pillar, and
wherein the fifth pillar has conductivity and is electrically connected to the one of the second wires and the third wire.

20. The electromagnetic wave sensor according to claim 11, further comprising:
a fourth wire; and
a second substrate which faces the first substrate; and
a sixth pillar which extends in a direction including at least a component of the third direction,
wherein the second wires are located between the first substrate and the second substrate, and
the positions of the second wires in the third direction are between a position of the fourth wire in the third direction and the position of the first substrate in the third direction,
wherein a position of at least a part of the sixth pillar in the third direction is located between the positions of the second wires in the third direction and a position of the second substrate in the third direction,
wherein one of the second wires is connected to the second substrate via at least the sixth pillar, and
wherein the sixth pillar has conductivity and is electrically connected to the one of the second wires and the fourth wire.

21. An electromagnetic wave sensor comprising:
a first substrate;
a first wire which extends in a first direction parallel to a substrate surface of the first substrate in a plan view from a direction perpendicular to the substrate surface;
a second wire which extends in a second direction parallel to the substrate surface and different from the first direction in the plan view; and
an electromagnetic wave detector which is electrically connected to the first wire and is electrically connected to the second wire,
wherein a position of the first wire in a third direction orthogonal to the first direction and the second direction is located between a position of the electromagnetic wave detector in the third direction and a position of the first substrate in the third direction,
wherein the position of the electromagnetic wave detector in the third direction is between a position of the second wire in the third direction and the position of the first substrate in the third direction, and
wherein the second wire has a width larger than that of the first wire in a plan view from the third direction.

22. An electromagnetic wave sensor comprising:
a first substrate;
a first wire which extends in a first direction parallel to a substrate surface of the first substrate in a plan view from a direction perpendicular to the substrate surface;
a second wire which extends in a second direction parallel to the substrate surface and different from the first direction in the plan view; and
an electromagnetic wave detector which is electrically connected to the first wire and is electrically connected to the second wire,
wherein a position of the first wire in a third direction orthogonal to the first direction and the second direction is located between a position of the electromagnetic wave detector in the third direction and a position of the first substrate in the third direction,
wherein the position of the electromagnetic wave detector in the third direction is between a position of the second wire in the third direction and the position of the first substrate in the third direction, and
wherein the second wire has a thickness larger than that of the first wire.

* * * * *